United States Patent
Karlsson et al.

(10) Patent No.: US 12,004,181 B2
(45) Date of Patent: Jun. 4, 2024

(54) RAN USER-PLANE SCHEDULING STRATEGY STEERING

(71) Applicant: Telefonaktiebolaget LM Ericsson (publ), Stockholm (SE)

(72) Inventors: Patrik Karlsson, Sollentuna (SE); Paul Stjernholm, Lidingö (SE); Erik Westerberg, Enskede (SE); Mathias Sintorn, Sollentuna (SE); Ulf Eric Andretzky, Huddinge (SE)

(73) Assignee: Telefonaktiebolagget LM Ericsson (Publ), Stockholm (SE)

( * ) Notice: Subject to any disclaimer, the term of this patent is extended or adjusted under 35 U.S.C. 154(b) by 368 days.

(21) Appl. No.: 17/432,844

(22) PCT Filed: Feb. 13, 2020

(86) PCT No.: PCT/IB2020/051203
§ 371 (c)(1),
(2) Date: Aug. 20, 2021

(87) PCT Pub. No.: WO2020/170087
PCT Pub. Date: Aug. 27, 2020

(65) Prior Publication Data
US 2022/0159699 A1    May 19, 2022

Related U.S. Application Data

(60) Provisional application No. 62/808,653, filed on Feb. 21, 2019.

(51) Int. Cl.
*H04W 72/23* (2023.01)
*H04W 72/1268* (2023.01)
*H04W 92/10* (2009.01)

(52) U.S. Cl.
CPC ....... *H04W 72/23* (2023.01); *H04W 72/1268* (2013.01); *H04W 92/10* (2013.01)

(58) Field of Classification Search
CPC . H04W 28/16; H04W 72/1268; H04W 72/23; H04W 88/085; H04W 92/10
See application file for complete search history.

(56) References Cited

U.S. PATENT DOCUMENTS

2010/0136903 A1* 6/2010 Lee ................... H04L 25/03343
455/17
2019/0150220 A1   5/2019 Byun et al.

FOREIGN PATENT DOCUMENTS

WO    WO 2019/031915 A1    2/2019

OTHER PUBLICATIONS

International Search Report and Written Opinion of the International Searching Authority, PCT/IB2020/051203, dated Apr. 24, 2020, 12 pages.

(Continued)

*Primary Examiner* — Nader Bolourchi
(74) *Attorney, Agent, or Firm* — Weisberg I.P. Law, P.A.

(57) ABSTRACT

A Central Unit-Control Plane (CU-CP) of a radio access network (RAN) node can operate in a communication network to dynamically schedule user-plane (UP) communications. The CU-CP can be communicatively coupled to a Distributed Unit (DU) and a Central Unit-User-Plane (CU-UP) of the RAN node. The CU-CP can provide indication of one or more available UP paths to at least one network element. The at least one network element can include one or more of: a user equipment, UE; the CU-UP of the RAN node; and/or the DU of the RAN node. The CU-CP can provide indication of a scheduling strategy for data transmissions to the at least one network element.

18 Claims, 17 Drawing Sheets

(56) References Cited

OTHER PUBLICATIONS

ZTE, 3GPP TSG-RAN WG3 Meeting #102, R3-186362, "(TP for BL CR for TS 38.423): Consideration on pre-allocation method on DL TNL address allocation at SN," Spokane, WA, Nov. 12-16, 2018, 14 pages.
NGMN Alliance, Richard Mackenzie, Editor/Submitter, "NGMN Overview on 5G RAN Functional Decomposition," Feb. 26, 2018, 48 pages.
$3^{rd}$ Generation Partnership Project; 3GPP TS 38.401 v15.0.0 (Dec. 2017), Technical Specification Group Radio Access Network; NG-RAN; Architecture description (Release 15), 23 pages.

\* cited by examiner

RAN USER-PLANE SCHEDULING STRATEGY STEERING

CROSS REFERENCE TO RELATED APPLICATIONS

This application is a 35 U.S.C. § 371 national stage application of PCT International Application No. PCT/IB2020/051203 filed on Feb. 13, 2020, which in turns claims domestic priority to U.S. Provisional Patent Application No. 62/808,653, filed on Feb. 21, 2019, the disclosures and content of which are incorporated by reference herein in their entirety.

TECHNICAL FIELD

The present disclosure relates generally to communications, and more particularly to communication methods and related devices and nodes supporting wireless communications.

BACKGROUND

A mobile network can be a distributed network built up by multiple antennas or transmission points (TRxP) (also referred to as sites), which is inter-connected with different transport capabilities. A user can be connected to one or multiple TRxPs over one or multiple carrier frequencies.

The $3^{rd}$ Generation Partnership Project (3GPP) specifies a 3-split RAN architecture, as illustrated in FIG. 1, with a Central Unit—User-Plane (CU-UP) 124, Central Unit-Control Plane (CU-CP) 122 and a Distributed Unit (DU) 126a-b. The DU 126a-b handles the radio link control (RLC), media access control (MAC) and physical layer. The CU-UP 124 is a user-plane above the RLC (e.g., a packet data convergence protocol (PDCP)) and the CU-CP 122 is a Layer 3 (e.g., radio resource control (RRC) signaling) and higher layer control of the connection. 3GPP also specifies the interfaces F1-C 130 and F1-U 140 from respective CU to the DU and the E1-interface 150 is between the CU-UP 124 and CU-CP 122. In some examples, oRAN specifies a similar complementing interface called E2 that can signal control information from a CU-CP towards a CU-UP or a DU.

The different carrier frequencies, transmission point, and transport can have different capabilities when it comes to capacity and latency. Additionally, the load may not be evenly distributed in the network. For example, one transmission point or carrier frequency can experience high load while another simultaneously can experience low load.

In some systems, the user-plane (UP) scheduling is a decision performed at the CU-CP respective DU. The scheduling result depends on the rules designed and applied in the respective unit which also can be from different vendors. The scheduling philosophy of different units and different vendors can be different. For example, one strategy can include scheduling the data on the frequency carrier that has best radio quality and another strategy can include selecting the frequency carrier that provides lowest latency.

SUMMARY

In some embodiments, a method performed by a Central Unit-Control Plane (CU-CP) of a radio access network (RAN) operating in a communication network to dynamically schedule (UP) communications is provided. The CU-CP is communicatively coupled to a distributed unit (DU) and a central unit—user-plane (CU-UP) of the RAN node. The method includes providing indication of one or more available UP paths to at least one network element. The at least one network element includes one or more of: a user equipment (UE); the CU-UP of the RAN node; and/or the DU of the RAN node. The method further includes providing indication of a scheduling strategy for data transmissions to the at least one network element.

In other embodiments, a Central Unit-Control Plane (CU-CP) of a radio access network (RAN) operating in a communication network is provided. The CU-CP is communicatively coupled to a distributed unit (DU) and a central unit—user-plane (CU-UP) of the RAN node. The CU-CP is adapted to perform operations. The operations include providing indication of one or more available UP paths to at least one network element. The at least one network element includes one or more of: a user equipment (UE); the CU-UP of the RAN node; and/or the DU of the RAN node. The operations further include providing indication of a scheduling strategy for data transmissions to the at least one network element.

In other embodiments, a Central Unit-Control Plane (CU-CP) of a radio access network (RAN) operating in a communication network is provided. The CU-CP is communicatively coupled to a distributed unit (DU) and a central unit—user-plane (CU-UP) of the RAN node. The CU-CP includes processing circuitry and memory coupled to the processing circuitry. The memory has instructions stored therein that are executable by the processing circuitry to cause the CU-CP to perform operations. The operations include providing indication of one or more available UP paths to at least one network element. The at least one network element includes one or more of: a user equipment (UE); the CU-UP of the RAN node; and/or the DU of the RAN node. The operations further include providing indication of a scheduling strategy for data transmissions to the at least one network element.

In other embodiments, a computer program is provided. The computer program includes program code to be executed by processing circuitry of a Central Unit—Control Plane (CU-CP) of a radio access network (RAN) operating in a communication network. The CU-CP is communicatively coupled to a distributed unit (DU) and a central unit—user-plane (CU-UP) of the RAN node. Execution of the program code causes the CU-CP to perform operations. The operations include providing indication of one or more available UP paths to at least one network element. The at least one network element includes one or more of: a user equipment (UE); the CU-UP of the RAN node; and/or the DU of the RAN node. The operations further include providing indication of a scheduling strategy for data transmissions to the at least one network element.

In other embodiments, a computer program product is provided. The computer program product includes a non-transitory storage medium including program code to be executed by processing circuitry of a Central Unit-Control Plane (CU-CP) of a radio access network (RAN) operating in a communication network. The CU-CP is communicatively coupled to a distributed unit (DU) and a central unit—user-plane (CU-UP) of the RAN node. Execution of the program code causes the CU-CP to perform operations. The operations include providing indication of one or more available UP paths to at least one network element. The at least one network element includes one or more of: a user equipment (UE); the CU-UP of the RAN node; and/or the DU of the RAN node. The operations further include providing indication of a scheduling strategy for data transmissions to the at least one network.

Various embodiments described herein allow a CU-CP to influence the UP scheduling philosophy that is used in the CU-UP and DU for specific users and user devices. This can enable a network operator to achieve a preferred and consistent network behavior, but also to achieve a behavior that can be optimized to different needs of different users, services or load situations.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Figure 1:
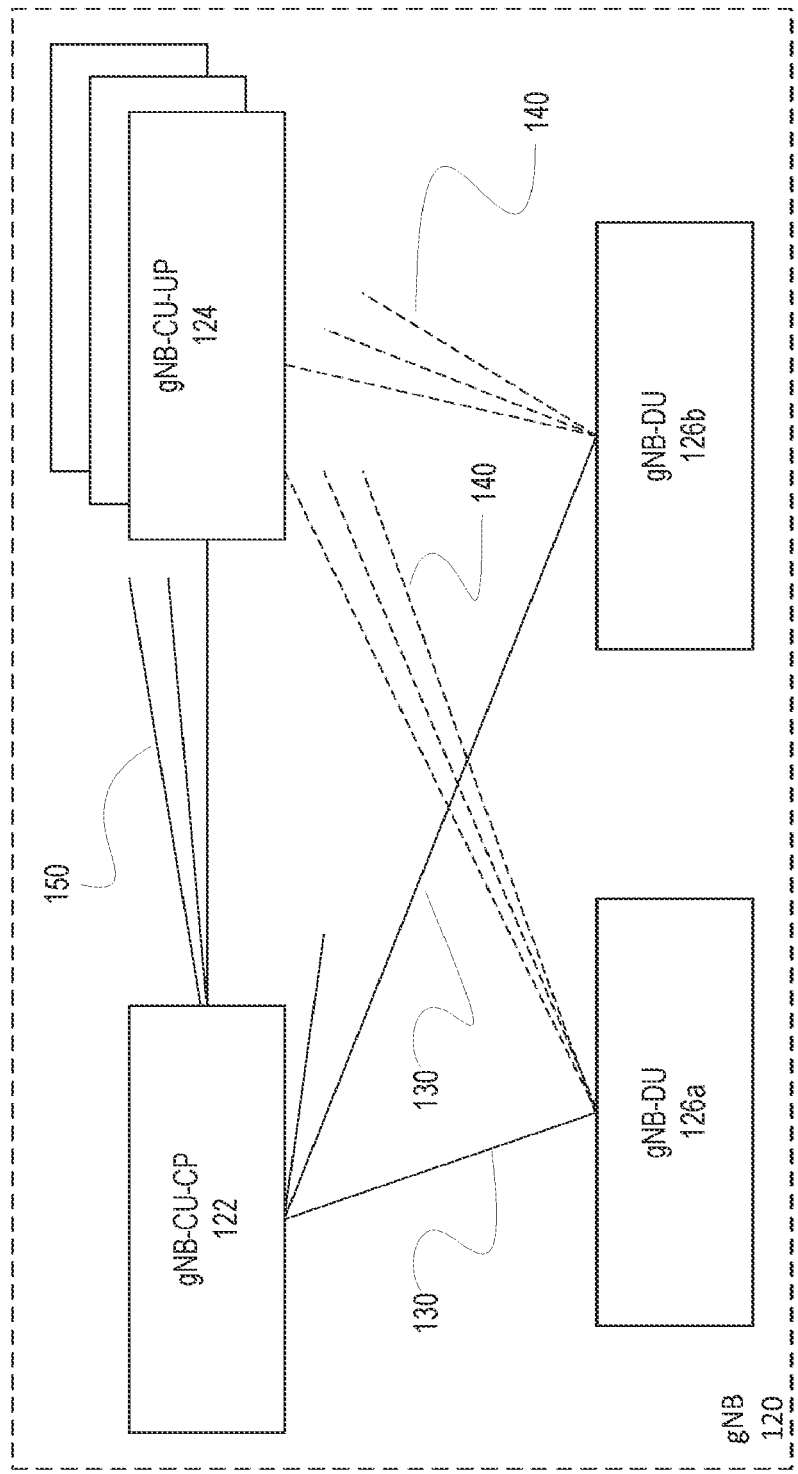
FIG. 1 is a block diagram illustrating an example of $3^{rd}$ Generation Partnership Project (3GPP) radio access network (RAN) architecture.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Different scheduling strategies have different advantages and drawbacks. Accordingly, it can be a problem if it is not possible to influence which scheduling strategy should be used in the system. A lack of control of the scheduling strategy can result in an inconsistent network behavior if there are different philosophies from different vendors. Furthermore, the preferred scheduling strategy may not necessarily be the same for all users in the system, the same over time, or the same in all areas. For example, it might be important to transmit a large file on a carrier frequency with the best radio conditions to minimize interference, while, for small files, latency might be preferred to quickly finish of the user. In another example, at high load the carrier frequency with the best radio conditions might be more important than latency to secure high system capacity, however, at low load having low latency might be preferred to provide best end-user experience.

A Central Unit-Control Plane (CU-CP) can be the unit within a radio access network (RAN) node that is most capable of determining user-plane (UP) scheduling philosophy for communicating with a wireless device (UE). The CU-CP can have the greatest overall control overview, overall observability, and knowledge of a communication network allowing the CU-CP to make a more accurate determination of UP scheduling philosophies than other network elements. Various embodiments herein allow a CU-CP to influence scheduling philosophies used by the CU-UP and DU in communications with a UE.

In some embodiments, the CU-CP signals which scheduling strategy should be applied in the DU with respect to the CU-UP. The signaling is performed via the F1-C interface and the E1 interface (or any similar interface, such as E2 in oRAN). In some examples, the control signal can be applied generally, such as per user or per service. The signaling from the CU-CP towards the CU-UP (via E1) and DU (F1-C) can define the scheduling strategy to be used. The DU then uses the scheduling strategy information received via E1 and/or F1-C to influence its user-plane scheduling decisions.

In additional or alternative embodiments, the CU-CP steers the UP scheduling philosophy that is used in the CU-UP and DU for each user. This can enable an network operator to achieve a preferred and consistent network behavior, but also to achieve a behavior that can be optimized to different needs of different users, services or load situations.

Figure 5:
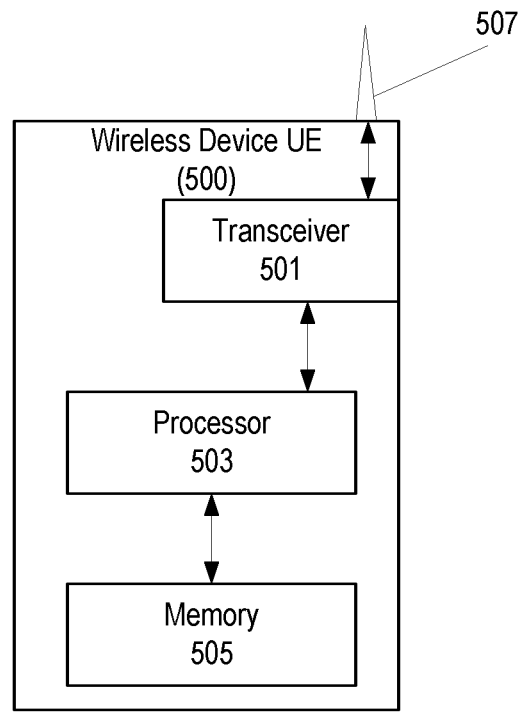
FIG. 5 is a block diagram illustrating an example of a UE in accordance with some embodiments.

FIG. 5 is a block diagram illustrating elements of a wireless device UE 500 (also referred to as a mobile terminal, a mobile communication terminal, a wireless communication device, a wireless terminal, mobile device, a wireless communication terminal, user equipment, UE, a user equipment node/terminal/device, etc.) configured to provide wireless communication according to embodiments of inventive concepts. (Wireless device 500 may be provided, for example, as discussed below with respect to wireless device QQ110 of FIG. 13.) As shown, wireless device UE may include an antenna 507 (e.g., corresponding to antenna QQ111 of FIG. 13), and transceiver circuitry 501 (also referred to as a transceiver, e.g., corresponding to interface QQ114 of FIG. 13) including a transmitter and a receiver configured to provide uplink and downlink radio communications with a base station(s) (e.g., corresponding to network node QQ160 of FIG. 13, also referred to as a RAN node) of a radio access network. Wireless device UE may also include processing circuitry 503 (also referred to as a processor, e.g., corresponding to processing circuitry QQ120 of FIG. 13) coupled to the transceiver circuitry, and memory circuitry 505 (also referred to as memory, e.g., corresponding to device readable medium QQ130 of FIG. 13) coupled to the processing circuitry. The memory circuitry 505 may include computer readable program code that when executed by the processing circuitry 503 causes the processing circuitry to perform operations according to embodiments disclosed herein. According to other embodiments, processing circuitry 503 may be defined to include memory so that separate memory circuitry is not required. Wireless device UE may also include an interface (such as a user interface) coupled with processing circuitry 503, and/or wireless device UE may be incorporated in a vehicle.

As discussed herein, operations of wireless device UE may be performed by processing circuitry 503 and/or transceiver circuitry 501. For example, processing circuitry 503 may control transceiver circuitry 501 to transmit communications through transceiver circuitry 501 over a radio interface to a radio access network node (also referred to as a base station) and/or to receive communications through transceiver circuitry 501 from a RAN node over a radio interface. Moreover, modules may be stored in memory circuitry 505, and these modules may provide instructions so that when instructions of a module are executed by processing circuitry 503, processing circuitry 503 performs respective operations (e.g., operations discussed below with respect to Example Embodiments relating to wireless devices).

Figure 6:
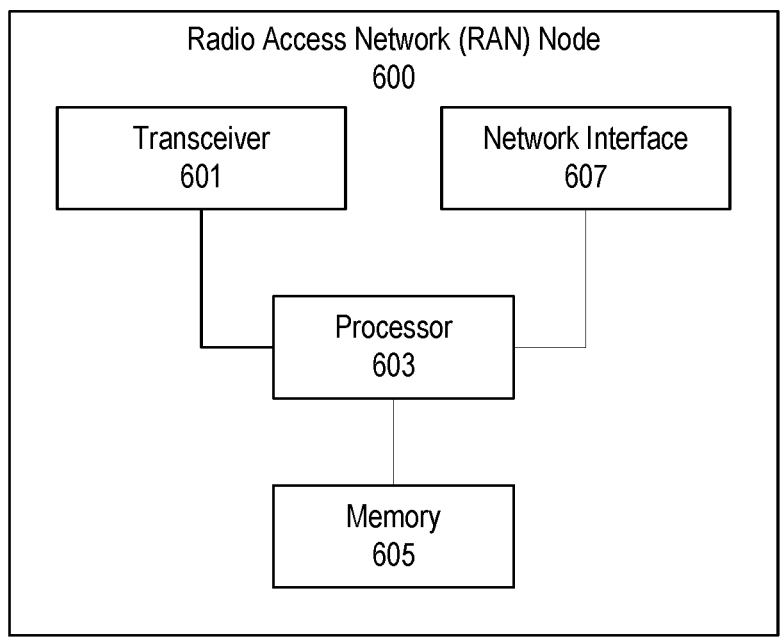
FIG. 6 is a block diagram illustrating an example of a RAN node (e.g., a base station 3NB/gNB) in accordance with some embodiments.

FIG. 6 is a block diagram illustrating elements of a radio access network RAN node 600 (also referred to as a network node, base station, eNodeB/eNB, gNodeB/gNB, etc.) of a Radio Access Network (RAN) configured to provide cellular communication according to embodiments of inventive concepts. (RAN node 600 may be provided, for example, as discussed below with respect to network node QQ160 of FIG. 13.) As shown, the RAN node may include transceiver circuitry 601 (also referred to as a transceiver, e.g., corresponding to portions of interface QQ190 of FIG. 13) including a transmitter and a receiver configured to provide uplink and downlink radio communications with mobile terminals. The RAN node may include network interface circuitry 607 (also referred to as a network interface, e.g., corresponding to portions of interface QQ190 of FIG. 13) configured to provide communications with other nodes (e.g., with other base stations) of the RAN and/or core network CN. The network node may also include processing circuitry 603 (also referred to as a processor, e.g., corresponding to processing circuitry QQ170) coupled to the transceiver circuitry, and memory circuitry 605 (also referred to as memory, e.g., corresponding to device readable medium QQ180 of FIG. 13) coupled to the processing circuitry. The memory circuitry 605 may include computer readable program code that when executed by the processing circuitry 603 causes the processing circuitry to perform operations according to embodiments disclosed herein. According to other embodiments, processing circuitry 603 may be defined to include memory so that a separate memory circuitry is not required.

As discussed herein, operations of the RAN node may be performed by processing circuitry 603, network interface 607, and/or transceiver 601. For example, processing circuitry 603 may control transceiver 601 to transmit downlink communications through transceiver 601 over a radio interface to one or more mobile terminals UEs and/or to receive uplink communications through transceiver 601 from one or more mobile terminals UEs over a radio interface. Similarly, processing circuitry 603 may control network interface 607 to transmit communications through network interface 607 to one or more other network nodes and/or to receive communications through network interface from one or more other network nodes. Moreover, modules may be stored in memory 605, and these modules may provide instructions so that when instructions of a module are executed by processing circuitry 603, processing circuitry 603 performs respective operations.

A RAN node can include a Central Unit-Control Plane (CU-CP) node, a Central Unit—User-Plane (CU-UP), and a Distributed Unit (DU) as illustrated in FIG. 1.

Figure 7:
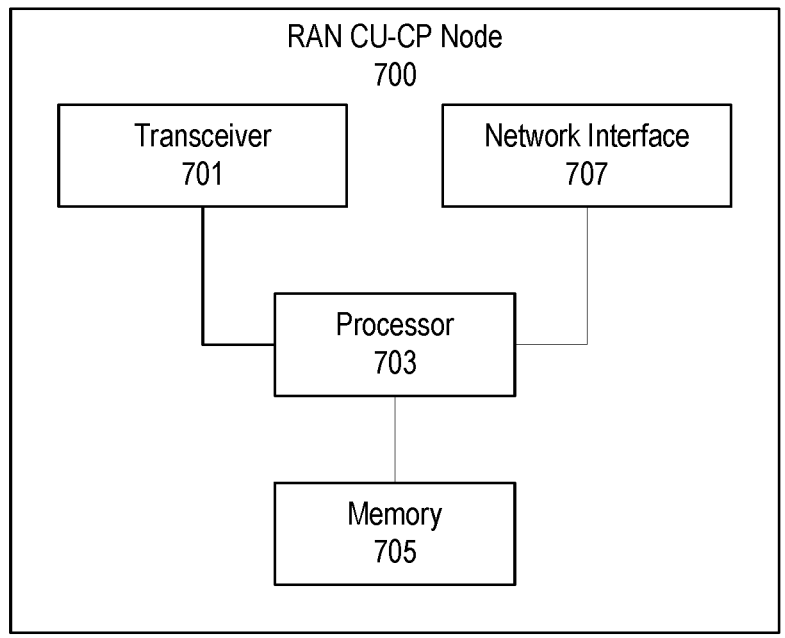
FIG. 7 is a block diagram illustrating an example of a RAN CU-CP node in accordance with some embodiments.

FIG. 7 is a block diagram illustrating elements of a CU-CP node 700 of a RAN node configured to provide cellular communication according to embodiments of inventive concepts. As shown, the CU-CP node 700 may include transceiver circuitry 701 (also referred to as a transceiver, e.g., corresponding to portions of interface QQ190 of FIG. 13) including a transmitter and a receiver configured to provide uplink and downlink radio communications with mobile terminals. The CU-CP node may include network interface circuitry 707 (also referred to as a network interface, e.g., corresponding to portions of interface QQ190 of FIG. 13) configured to provide communications with other nodes of the RAN, core network CN, and/or other nodes of the RAN node (e.g., with a CU-UP node or DU node). The CU-UP is a network node and may also include processing circuitry 703 (also referred to as a processor, e.g., corresponding to processing circuitry QQ170) coupled to the transceiver circuitry, and memory circuitry 705 (also referred to as memory, e.g., corresponding to device readable medium QQ180 of FIG. 13) coupled to the processing circuitry. The memory circuitry 705 may include computer readable program code that when executed by the processing circuitry 703 causes the processing circuitry to perform operations according to embodiments disclosed herein. According to other embodiments, processing circuitry 703 may be defined to include memory so that a separate memory circuitry is not required.

As discussed herein, operations of the CU-CP node may be performed by processing circuitry 703, network interface 707, and/or transceiver 701. For example, processing circuitry 703 may control transceiver 701 to transmit downlink communications through transceiver 701 over a radio interface to one or more mobile terminals UEs and/or to receive uplink communications through transceiver 701 from one or more mobile terminals UEs over a radio interface. Similarly, processing circuitry 703 may control network interface 707 to transmit communications through network interface 707 to one or more other nodes in the RAN node and/or to receive communications through network interface from one or more other nodes in the RAN node. Moreover, modules may be stored in memory 705, and these modules may provide instructions so that when instructions of a module are executed by processing circuitry 703, processing circuitry 703 performs respective operations.

Figure 8:
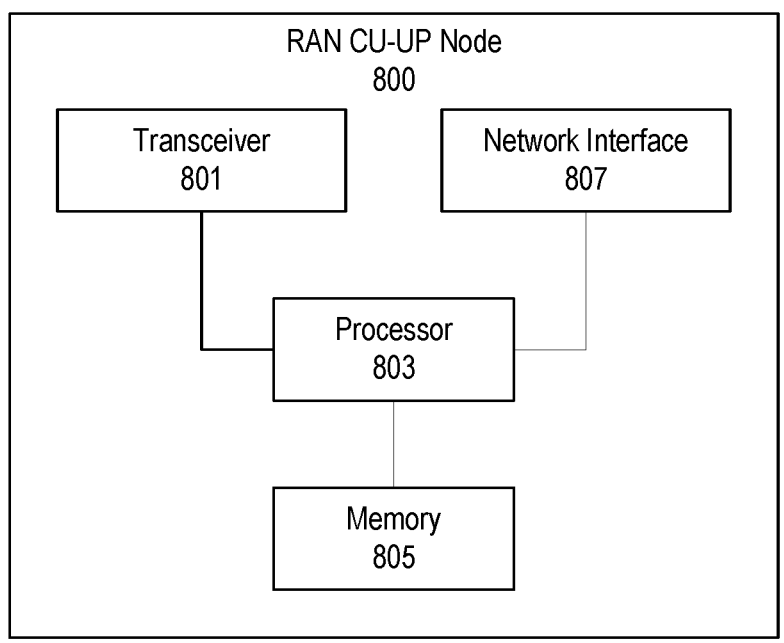
FIG. 8 is a block diagram illustrating an example of a RAN CU-UP node in accordance with some embodiments.

FIG. 8 is a block diagram illustrating elements of a CU-UP node 800 of a RAN node configured to provide cellular communication according to embodiments of inventive concepts. As shown, the CU-UP node 800 may include transceiver circuitry 701 (also referred to as a transceiver, e.g., corresponding to portions of interface QQ190 of FIG. 13) including a transmitter and a receiver configured to provide uplink and downlink radio communications with mobile terminals. The CU-UP node may include network interface circuitry 807 (also referred to as a network interface, e.g., corresponding to portions of interface QQ190 of FIG. 13) configured to provide communications with other nodes of the RAN, core network CN, and/or other nodes of the RAN node (e.g., CU-CP nodes or DU nodes). The CU-UP is a network node and may also include processing circuitry 803 (also referred to as a processor, e.g., corresponding to processing circuitry QQ170) coupled to the transceiver circuitry, and memory circuitry 805 (also referred to as memory, e.g., corresponding to device readable medium QQ180 of FIG. 13) coupled to the processing circuitry. The memory circuitry 805 may include computer readable program code that when executed by the processing circuitry 803 causes the processing circuitry to perform operations according to embodiments disclosed herein. According to other embodiments, processing circuitry 803 may be defined to include memory so that a separate memory circuitry is not required.

As discussed herein, operations of the CU-UP node may be performed by processing circuitry 803, network interface 807, and/or transceiver 801. For example, processing circuitry 803 may control transceiver 801 to transmit downlink communications through transceiver 801 over a radio interface to one or more mobile terminals UEs and/or to receive uplink communications through transceiver 801 from one or more mobile terminals UEs over a radio interface. Similarly, processing circuitry 803 may control network interface 807 to transmit communications through network interface 807 to one or more other nodes in the RAN node and/or to receive communications through network interface from one or more other nodes in the RAN node. Moreover, modules may be stored in memory 805, and these modules may provide instructions so that when instructions of a module are executed by processing circuitry 803, processing circuitry 803 performs respective operations.

Figure 9:
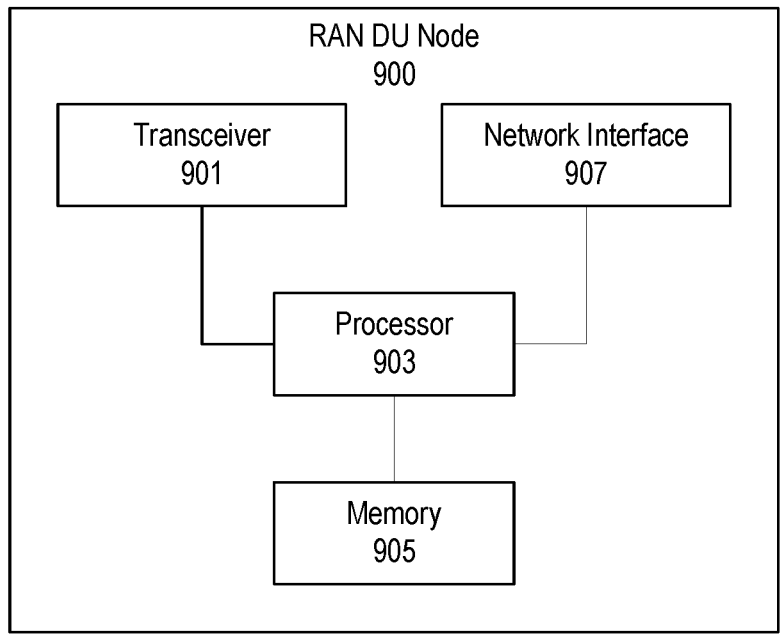
FIG. 9 is a block diagram illustrating an example of a RAN DU node in accordance with some embodiments.

FIG. 9 is a block diagram illustrating elements of a DU node 900 of a RAN node configured to provide cellular communication according to embodiments of inventive concepts. As shown, the DU node 900 may include transceiver circuitry 901 (also referred to as a transceiver, e.g., corresponding to portions of interface QQ190 of FIG. 13) including a transmitter and a receiver configured to provide uplink and downlink radio communications with mobile terminals. The DU node may include network interface circuitry 907 (also referred to as a network interface, e.g., corresponding to portions of interface QQ190 of FIG. 13) configured to provide communications with other nodes of the RAN, core network CN, and/or nodes of the RAN node. The DU node is a network node and may also include processing circuitry 903 (also referred to as a processor, e.g., corresponding to processing circuitry QQ170) coupled to the transceiver circuitry, and memory circuitry 905 (also referred to as memory, e.g., corresponding to device readable medium QQ180 of FIG. 13) coupled to the processing circuitry. The memory circuitry 905 may include computer readable program code that when executed by the processing circuitry 903 causes the processing circuitry to perform operations according to embodiments disclosed herein. According to other embodiments, processing circuitry 903 may be defined to include memory so that a separate memory circuitry is not required.

As discussed herein, operations of the DU node may be performed by processing circuitry 903, network interface 907, and/or transceiver 901. For example, processing circuitry 903 may control transceiver 901 to transmit downlink communications through transceiver 901 over a radio interface to one or more mobile terminals UEs and/or to receive uplink communications through transceiver 901 from one or more mobile terminals UEs over a radio interface. Similarly, processing circuitry 903 may control network interface 907 to transmit communications through network interface 907 to one or more other nodes in the RAN node and/or to receive communications through network interface from one or more other nodes in the RAN node. Moreover, modules may be stored in memory 905, and these modules may provide instructions so that when instructions of a module are executed by processing circuitry 903, processing circuitry 903 performs respective operations.

According to some other embodiments, a network node may be implemented as a core network CN node without a transceiver. In such embodiments, transmission to a wireless device UE may be initiated by the network node so that transmission to the wireless device is provided through a network node including a transceiver (e.g., through a base station or RAN node). According to embodiments where the network node is a RAN node including a transceiver, initiating transmission may include transmitting through the transceiver.

Figure 10:
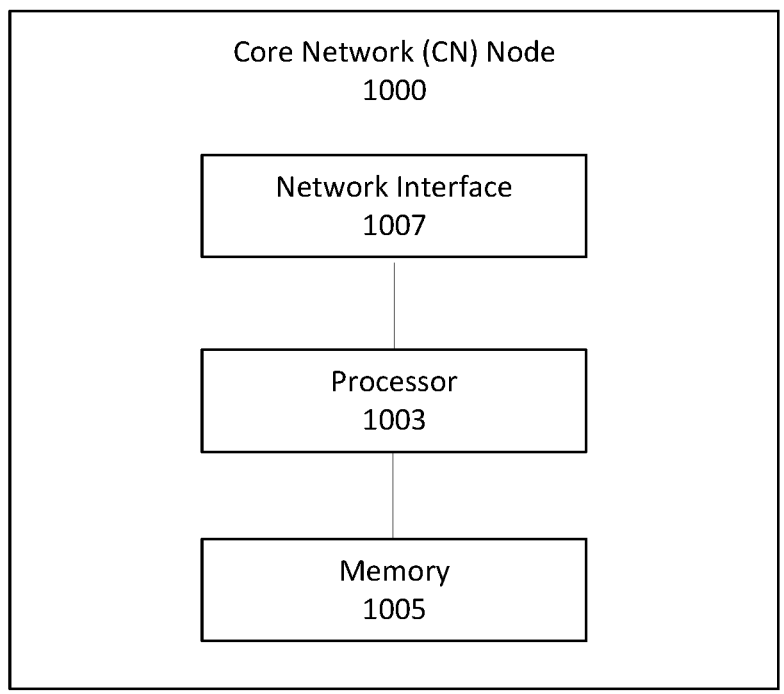
FIG. 10 is a block diagram illustrating an example of a core network CN node (e.g., an AMF node, an SMF node, etc.) in accordance with some embodiments.

FIG. 10 is a block diagram illustrating elements of a core network CN node (e.g., an SMF node, an AMF node, etc.) of a communication network configured to provide cellular communication according to embodiments of inventive concepts. As shown, the CN node may include network interface circuitry 1007 (also referred to as a network interface) configured to provide communications with other nodes of the core network and/or the radio access network RAN. The CN node may also include a processing circuitry 1003 (also referred to as a processor) coupled to the network interface circuitry, and memory circuitry 1005 (also referred to as memory) coupled to the processing circuitry. The memory circuitry 1005 may include computer readable program code that when executed by the processing circuitry 1003 causes the processing circuitry to perform operations according to embodiments disclosed herein. According to other embodiments, processing circuitry 1003 may be defined to include memory so that a separate memory circuitry is not required.

As discussed herein, operations of the CN node may be performed by processing circuitry 1003 and/or network interface circuitry 1007. For example, processing circuitry 1003 may control network interface circuitry 1007 to transmit communications through network interface circuitry 1007 to one or more other network nodes and/or to receive communications through network interface circuitry from one or more other network nodes. Moreover, modules may be stored in memory 1005, and these modules may provide instructions so that when instructions of a module are executed by processing circuitry 1003, processing circuitry 1003 performs respective operations.

Figure 2:
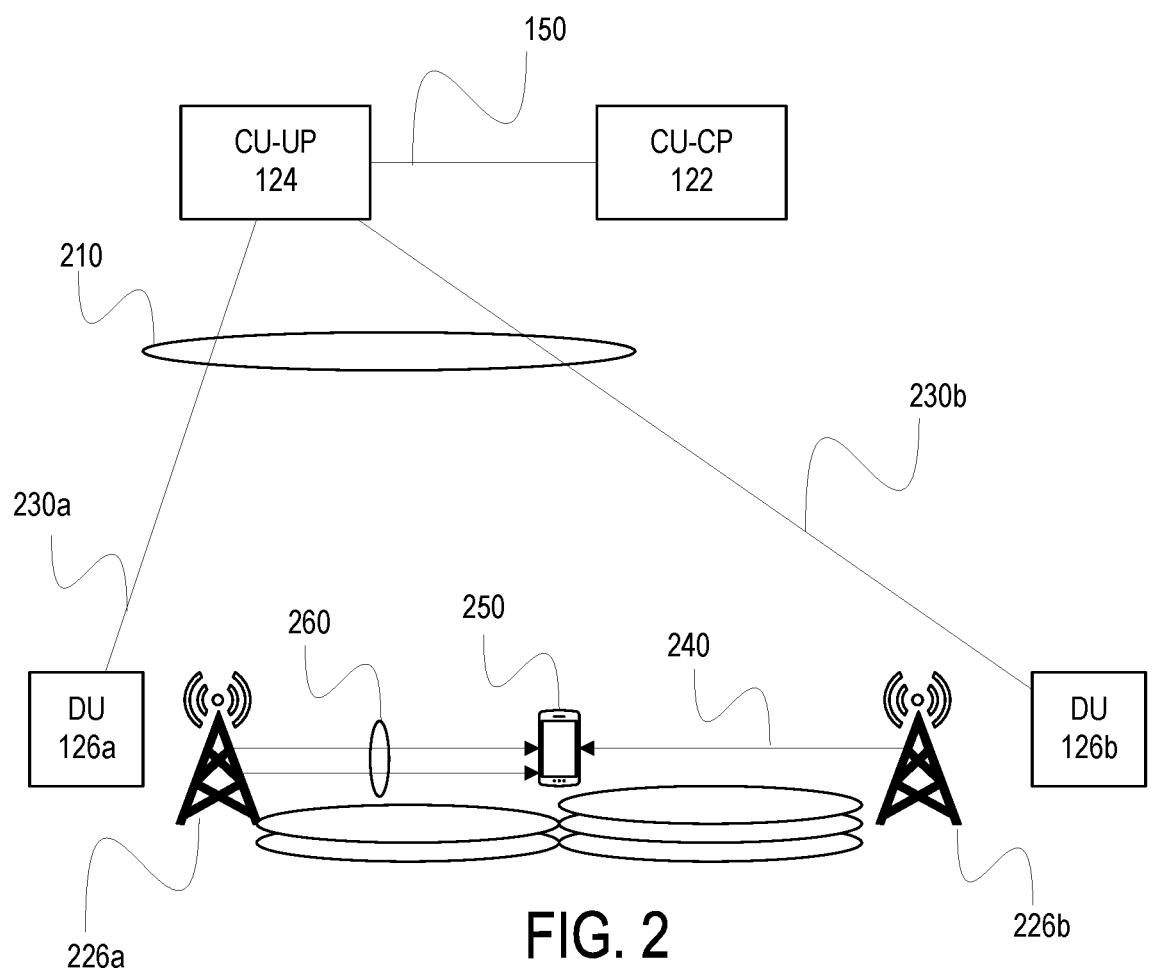
FIG. 2 is a schematic diagram illustrating an example of a wireless device (UE) configured with three carriers (two with carrier aggregation and one with dual connectivity) split over two transmission points in accordance with some embodiments.

FIG. 2 illustrates a communication network with a RAN node having the CU-UP 122, CU-CP 124, and DUs 126*a-b* of FIG. 1. The CU-CP 124 can be communicatively coupled to the CU-UP 122 by the E1 interface 150. The CU-UP 124 can be communicatively coupled to the DUs 126*a-b* by F1-U interfaces 230*a-b*. The DUs 126*a-b* can each include or be communicatively coupled to one of the TRxPs 226*a-b*, which can communicate with a UE 250 by a carrier 240. In this example, the UE 250 is configured with three carrier 240 with dual connectivity (DC) 210 between the two TRxPs 226*a-b* and with carrier aggregation (CA) 260 associated with the carriers 240 corresponding to TRxP 226*a*.

The CU-CP 122 can control and configure the connection used for the UE 250. Based on UE and system measurements, the CU-CP 122 determines whether a connection should be configured with more than one sector carrier and from which TrxPs 226*a-b* and sites. In some embodiments, the CU-CP controls and configures the CU-UP 124 and DUs 126*a-b* by providing an indication of the UP paths to be used for the UE 250.

Figure 3:
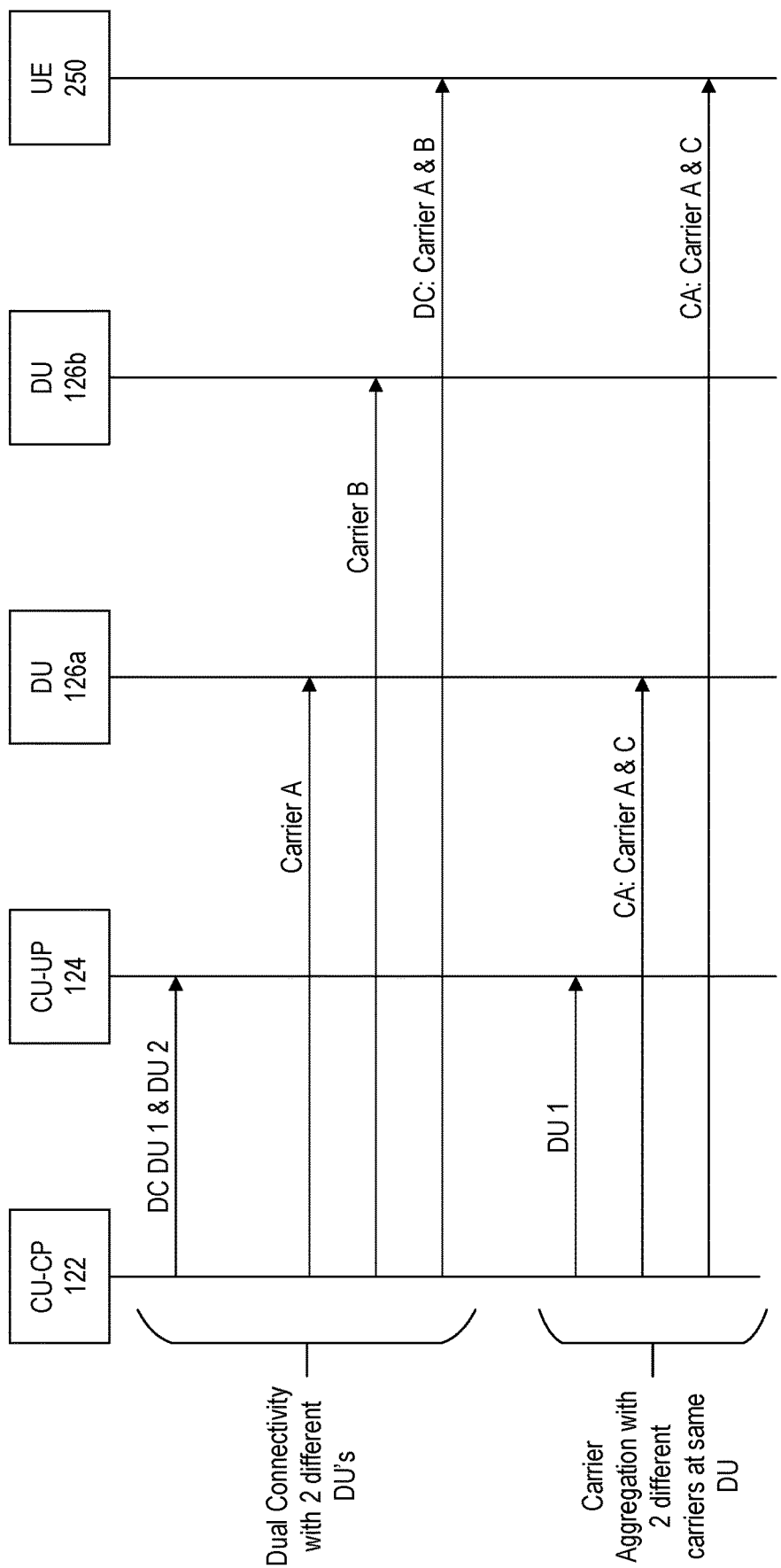
FIG. 3 is a signal flow diagram illustrating an example of Central Unit—Control Plane (CU-CP), Central Unit—User-Plane (CU-UP), Distributed Unit (DU), and UE signaling in accordance with some embodiments.

FIG. 3 illustrates a signal flow diagram of an example of the CU-CP 122 communicating with the CU-UP 124, DUs 126*a-b*, and UE 250. In this example, the CU-CP 122 configures the CU-UP 124, DUs 126*a-b*, and the UE 250 to be part of the connection. In additional or alternative examples, acknowledgments and additional signaling may be included.

In some embodiments, the CU-CP 122 dynamically configures a scheduling strategy that the respective scheduler uses when making scheduling decisions for data transmission associated with the UE 250. In additional or alternative embodiments, mapping of data flows to radio bearers is part of the configuration.

In additional or alternative embodiments, the scheduling strategy signaled may be applied at different resolutions, for example, for all users, per user, per group of users, per service, and/or per specific service of the user.

In additional or alternative embodiments, the scheduling strategy may influence how a network element should distribute transmissions associated with a UE. Scheduling strategy examples include frequency strategy and characteristic strategy.

Frequency strategies influence which frequency carrier should be used for communication with a UE. Examples of frequency strategies include: "Normal," "Preferred," "Avoid," "Shall Not," and "Shall." A "Normal" frequency strategy can indicate that a network element use its unit own preferred process of selecting a carrier frequency. A "Preferred" frequency strategy can indicate that a network element should favor the selection of a specific carrier frequency even if the carrier frequency does not have best radio quality or latency unless as long as the carrier frequency meets a predetermined condition (e.g., if the connection retainability or QoS requirement is not at risk). An "Avoid" frequency strategy can indicate that a network element should avoid selecting a specific carrier unless a predetermined condition is met (e.g., the connection retainability or QoS requirement at risk). A "Shall Not" frequency strategy can indicate that a network element not select a specific carrier frequency under any conditions. A "Shall" frequency strategy can indicate a network element should select a specific carrier frequency regardless of whether a predetermined condition is met (e.g., regardless of whether connection retainability or QoS is at risk).

Examples of scheduling strategies with frequency strategies include: Scheduling strategy (UE_ID, Frequency X: Preferred, Data flow A); Scheduling strategy (UE_ID, Frequency X: avoid, Data flow B); and Scheduling strategy (Group_ID, Frequency Y: shall not, Data flow all). In these examples, the first element can indicate to which UEs or situation a scheduling strategy applies; the second element can indicate the frequency strategy; and the third element can indicate an associated UP path. Accordingly, Scheduling Strategy (UE_ID, Frequency X: Preferred, Data flow A) can indicate that for communications associated with a specific UE associated with UE_ID, frequency X is preferred over UP path A. Scheduling strategy (UE_ID, Frequency X: avoid, Data flow B) can indicate that for communications associated with the specific UE, frequency X should be avoided over UP path B. Scheduling strategy (Group_ID, Frequency Y: shall not, Data flow all) can indicate that for communications associated with a group of UEs associated with Group_ID, frequency Y shall not be used over any UP paths. In additional or alternative examples, scheduling strategy can include multiple frequencies with different scheduling strategies A characteristic strategy can influence which characteristic should be prioritized when scheduling communication. For example, a characteristic strategy can indicate whether to prioritize latency, spectrum efficiency, low loaded carriers (e.g., a carrier frequency with a load below a predetermined threshold level), or low loaded sites (e.g., a TRxP with a load below a threshold level).

Examples of scheduling strategies with characteristic strategies include: Scheduling strategy (UE_ID, latency, Data flow A); Scheduling strategy (UE_ID, spectrum efficiency, Data flow B); and Scheduling strategy (Group ID, spectrum efficiency, Data flow all). The first element in these examples include an identification of one or more UEs or services a scheduling strategy applies; the second element can indicate the characteristic strategy; and the third element can indicate an associated UP path. Accordingly, Scheduling strategy (UE_ID, latency, Data flow A) can indicate that latency should be prioritized when scheduling communication with the UE over UP path A. Scheduling strategy (UE_ID, spectrum efficiency, Data flow B) can indicate that spectrum efficiency should be prioritized when scheduling communication with the UE over UP path B. Scheduling strategy (Group ID, spectrum efficiency, Data flow all) can indicate that spectrum efficiency should be prioritized when scheduling communication with any UE associated with the Group ID over any of the UP paths.

Figure 4:
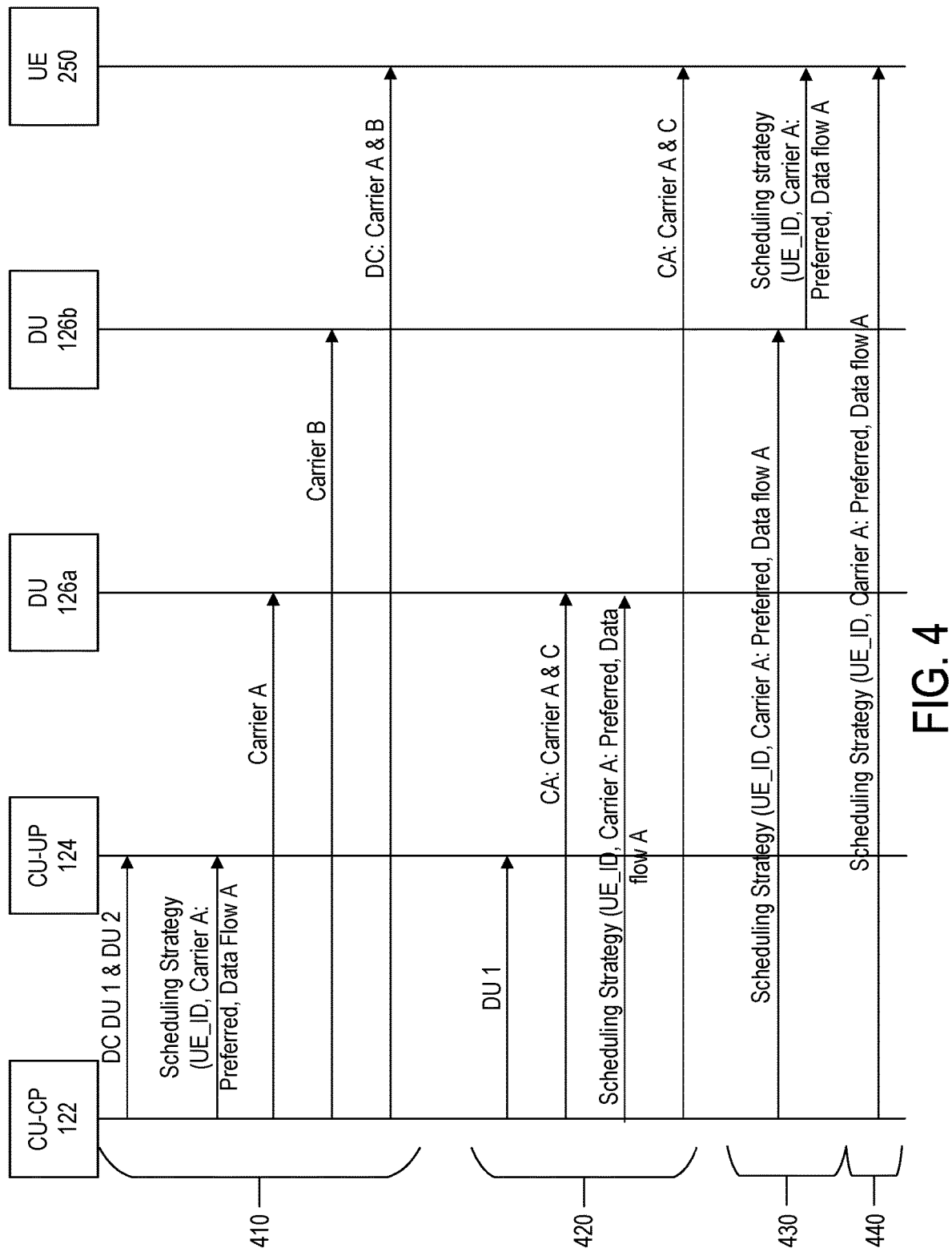
FIG. 4 is a signal flow diagram illustrating an example of CU-CP, CU-UP, DU, and UE signaling corresponding to an example scheduling strategy in accordance with some embodiments.

In some embodiments, the characteristic strategy can be combined with site and frequency strategies FIG. 4 illustrates a signal flow diagram of examples of transmitting a scheduling strategy to one or more network nodes that include the CU-UP 124, DUs 126*a-b*, and the UE 250. The signals 410 illustrate an example in which Dual Connectivity is configured for the connection with two different DUs. The CU-CP 122 instructs the CU-UP 124 that UE 250 associated with identity UE_ID should preferably use Carrier A for Data flow A. The same scheduling strategy is conveyed to the DU 126*a-b* by signals 420, which represent an example with carrier aggregation with two different carriers at the same DU. Signals 430 provide the scheduling strategy to the UE 250 by transmitting the scheduling strategy to DU 126*b* and causing DU 126*b* to transmit the scheduling strategy to the UE 250. Signal 440 illustrates the scheduling strategy being transmitted directly from the CU-CP 122 to the UE 250. In some examples, signal 440 includes one or more RRC signals. FIG. 4 depicts the scheduling strategy being transmitted as part of an individual signal, but other implementations are possible. In some embodiments, indication of one or more available UP paths is transmitted in a first signal and indication of a scheduling strategy (e.g., a frequency strategy or a characteristic strategy) is transmitted in a second signal.

Figure 11:
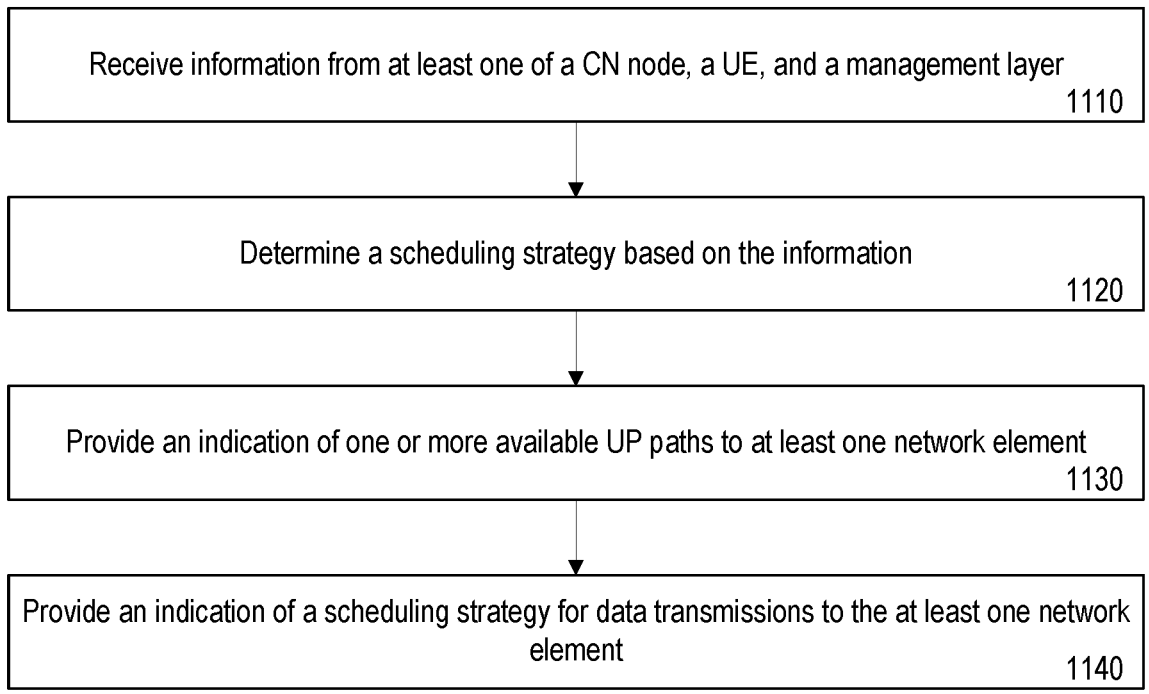
FIG. 11 is a flow chart illustrating an example of operations of a CU-CP node in accordance with some embodiments.

Operations of the CU-CP 700 (implemented using the structure of the block diagram of FIG. 7) will now be discussed with reference to the flow chart of FIG. 11 according to some embodiments of inventive concepts. For example, modules may be stored in memory 705 of FIG. 11, and these modules may provide instructions so that when the instructions of a module are executed by respective CU-CP processing circuitry 703, processing circuitry 703 performs respective operations of the flow chart. FIG. 11 is described below in reference to a CU-CP that is part of a RAN node (e.g., RAN node (600)) and communicatively coupled to a CU-UP (e.g., CU-UP (800)) of the RAN node and a DU (e.g., DU (900)) of the RAN node.

At block 1110, processing circuitry 703 receives, via transceiver 701 or network interface 707, information from at least one of a CN node, a UE, and a management layer. In some embodiments, the information includes at least one of: a load on the communication network and subscriptions or services associated with the user. At block 1120, processing circuitry 703 determines a scheduling strategy based on the information.

At block 1130, processing circuitry 703 provides an indication of one or more available UP paths to at least one network element. In some embodiments, the at least one network element includes one or more of: a user equipment, UE (e.g., UE 500); the CU-UP of the RAN node; and/or the DU of the RAN node. In additional or alternative embodiments, providing the indication of the one or more UP paths includes providing a mapping of one or more data flows to one or more radio bearers.

In additional or alternative embodiments, the at least one network element includes the UE and providing the indication of the one or more available UP paths to the at least one network element includes transmitting radio resource control, RRC, signals to the UE indicating the one or more available UP paths. In additional or alternative embodiments, the at least one network element includes the UE and providing the indication of the one or more available UP paths to the at least one network element includes transmitting a first signal to the DU causing the DU to provide indication of the one or more available UP paths to the UE At block 1140, processing circuitry 703 provides an indication of a scheduling strategy for data transmissions to the at least one network element. In some embodiments, providing the indication of the scheduling strategy further includes providing an indication to apply the scheduling strategy to at least one of: all users, a user, a group of users, a service, and a service of a user. In additional or alternative embodiments, the indication of the scheduling strategy includes an indication of one or more of: a UE identifier, a frequency, or a group identifier. In additional or alternative embodiments, the indication of the scheduling strategy indicates a characteristic to prioritize, the characteristic including at least one of: latency, spectrum efficiency, low loaded carriers, or low loaded sites.

In additional or alternative embodiments, the at least one network element includes the UE and providing the indication of the scheduling strategy for data transmissions to the at least one network element includes transmitting the RRC signals to the UE indicating the scheduling strategy. In additional or alternative embodiments, the at least one network element includes the UE and providing the indication of the scheduling strategy for data transmissions to the at least one network element includes transmitting a second signal to DU causing the DU to provide indication of the scheduling strategy to the UE.

In additional or alternative embodiments, the scheduling strategy indicates a carrier frequency selection strategy including at least one of: (1) an indication that the network element determine a process to select a carrier frequency of a plurality of carrier frequency, (2) an indication that the network element shall select a specific carrier frequency of the plurality of carrier frequencies even if the carrier frequency does not have a highest radio quality or highest latency, (3) an indication that the network element shall not select the specific carrier frequency of the plurality of carrier frequencies, (4) an indication that the specific carrier frequency of the plurality of carrier frequencies is preferred and that the network element should select the specific carrier frequency (5) an indication that the network element avoid selecting a carrier frequency, and (6) an indication that the network element select a carrier frequency if connection retainability or quality of service is determined to not be at risk (e.g., below a threshold risk value).

Various operations from the flow charts of FIG. 11 may be optional with respect to some embodiments of wireless devices and related methods. Regarding methods of example embodiment 33 (set forth below), for example, operations of block 1110 and 1120 of FIG. 11 may be optional.

Operations of the wireless device 500 (implemented using the structure of the block diagram of FIG. 5) will now be discussed with reference to the flow chart of FIG. 12 according to some embodiments of inventive concepts. For example, modules may be stored in memory 505 of FIG. 12, and these modules may provide instructions so that when the instructions of a module are executed by respective wireless device processing circuitry 503, processing circuitry 503 performs respective operations of the flow chart.

At block 1210, processing circuitry 503 transmits, via transceiver 501, user data to a CU-CP of a RAN node. The CU-CP can be communicatively coupled to a CU-UP and a DU of the RAN node. At block 1220, processing circuitry 503 receives, via transceiver 501, an indication of one or more available UP paths from the CU-CP. In some embodiments, receiving the indication of the one or more UP paths further includes receiving a mapping of one or more data flows to one or more radio bearers.

At block 1230, processing circuitry 503 receives, via transceiver 501, an indication of a scheduling strategy for data transmission from the CU-CP. In some embodiments, receiving the indication of the scheduling strategy includes receiving an indication to apply the scheduling strategy to at least one of: all users, a user, a group of users, a service, or a service of a user. In additional or alternative embodiments, receiving the indication of the scheduling strategy includes receiving an indication of one or more of: a wireless device identifier, a frequency, or a group identifier. In additional or alternative embodiments, receiving the indication of the scheduling strategy includes receiving a characteristic to prioritize, the characteristic including at least one of: latency, spectrum efficiency, low loaded carriers, or low loaded sites.

In additional or alternative embodiments, receiving the indication of the scheduling strategy includes receiving an indication of a carrier frequency selection strategy including at least one of: (1) an indication that the wireless device determine a process to select a carrier frequency of a plurality of carrier frequency, (2) an indication that the wireless device select a specific carrier frequency of the plurality carrier frequencies even if the carrier frequency does not have a highest radio quality or highest latency, (3) an indication that the wireless device avoid selecting a carrier frequency, and (4) an indication that the wireless device select a carrier frequency if connection retainability or quality of service is below a threshold risk value.

At block 1240, processing circuitry 503 transmits, via transceiver 501, data to the RAN node based on the indication of the scheduling strategy and the indication of the one or more available UP paths.

Figure 12:
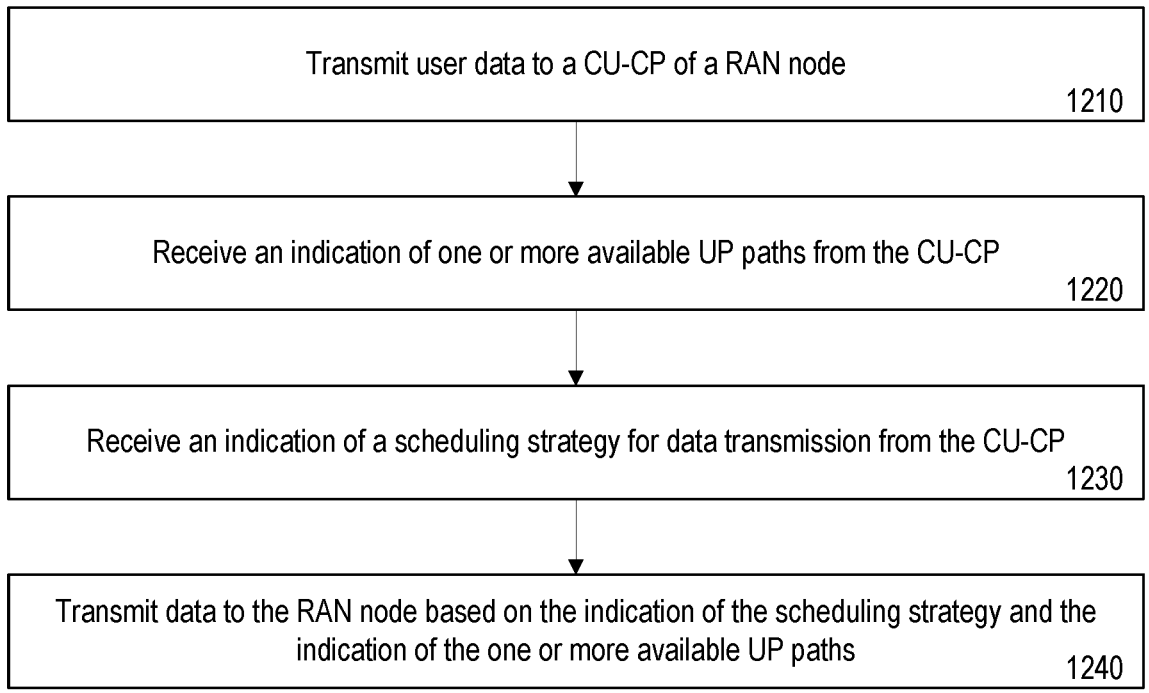
FIG. 12 is a flow chart illustrating an example of operations of a UE in accordance with some embodiments.

Various operations from the flow charts of FIG. 12 may be optional with respect to some embodiments of wireless devices and related methods. Regarding methods of example embodiment 17 (set forth below), for example, operations of block 1210 and 1240 of FIG. 12 may be optional.

Example embodiments are discussed below.

Embodiment 1. A method performed by a wireless device for dynamically scheduling user-plane communications, the method comprising:
receiving, from a Central Unit—Control plane, CU-CP, one or more available user-plane paths; and
receiving, from the CU-CP, a scheduling strategy for data transmissions.

Embodiment 2. The method of any of the previous embodiments, wherein receiving the one or more user-plane paths further includes receiving a mapping of one or more data flows to one or more radio bearers.

Embodiment 3. The method of any of the previous embodiments, wherein the scheduling strategy is applied to at least one of: all users, per user, per group of users, per service, or per service of a user.

Embodiment 4. The method of any of the previous embodiments, wherein the scheduling strategy includes one or more of: a wireless device identifier, a frequency, or a group identifier.

Embodiment 5. The method of any of the previous embodiments, wherein the scheduling strategy indicates a frequency carrier selection strategy including at least one of: for the wireless device to use its own preferred solution of selecting a carrier, for the wireless device to favor a carrier even if the carrier does not have a highest radio quality or latency, for the wireless device to avoid selecting a carrier, or for the wireless device to select a carrier if connection retainability or quality of service is at risk.

Embodiment 6. The method of any of the previous embodiments, wherein the scheduling strategy indicates a characteristic for the wireless device the prioritize, the characteristic including at least one of: latency, spectrum efficiency, low loaded carriers, or low loaded sites.

Embodiment 7. A method performed by Central Unit—Control plane, CU-CP, for dynamically scheduling user-plane communications, the method comprising:

providing one or more available user-plane paths to one or more network elements, the one or more network elements including:
a user equipment, UE,
a Central Unit—User-Plane, CU-UP; and/or
a Distributed Unit, DU; and
providing, to the UE, CU-UP, and/or DU, a scheduling strategy for data transmissions.

Embodiment 8. The method of any of the previous embodiments, wherein providing the one or more user-plane paths further includes providing a mapping of one or more data flows to one or more radio bearers.

Embodiment 9. The method of any of the previous embodiments, wherein the scheduling strategy is applied to at least one of: all users, per user, per group of users, per service, or per service of a user.

Embodiment 10. The method of any of the previous embodiments, wherein the scheduling strategy includes one or more of: a UE identifier, a frequency, or a group identifier.

Embodiment 11. The method of any of the previous embodiments, wherein the scheduling strategy indicates a frequency carrier selection strategy including at least one of: for the network element to use its own preferred solution of selecting a carrier, for the network element to favor a carrier even if the carrier does not have a highest radio quality or latency, for the network element to avoid selecting a carrier, or for the network element to select a carrier if connection retainability or quality of service is at risk.

Embodiment 12. The method of any of the previous embodiments, wherein the scheduling strategy indicates a characteristic to prioritize, the characteristic including at least one of: latency, spectrum efficiency, low loaded carriers, or low loaded sites.

Embodiment 13. A wireless device for scheduling user-plane communications, the wireless device comprising:
processing circuitry configured to perform any of the steps of any of the Group A embodiments; and
power supply circuitry configured to supply power to the wireless device.

Embodiment 14. A base station for scheduling user-plane communications, the base station comprising:
processing circuitry configured to perform any of the steps of any of the Group B embodiments;
power supply circuitry configured to supply power to the base station.

Embodiment 15. A user equipment (UE) comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

Embodiment 16. A method performed by a Central Unit-Control Plane, CU-CP, (700) of a radio access network, RAN, node (800) operating in a communication network to dynamically schedule user-plane communications, the method comprising:

providing (1130) one or more available user-plane, UP, paths to at least one network element, the at least one network element comprising one or more of: a user equipment, UE (500); a Central Unit—User-Plane, CU-UP, (800) of the RAN node; and/or a Distributed Unit, DU, (900) of the RAN node; and providing (1140) a scheduling strategy for data transmissions to the at least one network element.

Embodiment 17. A method performed by a wireless device (500) operating in a communication network to dynamically schedule user-plane communications, the method comprising:

receiving (1220) one or more available user-plane, UP, paths from a Central Unit-Control plane, CU-CP, (700) of a radio access network, RAN, node (600) operating in the communication network; and receiving (1230) a scheduling strategy for data transmissions from the CU-CP (700) of the RAN node.

Embodiment 18. The method of Embodiment 17, wherein receiving the one or more UP paths further comprises receiving a mapping of one or more data flows to one or more radio bearers.

Embodiment 19. The method of any of Embodiments 17-18, wherein receiving the scheduling strategy comprises receiving an indication to apply the scheduling strategy to at least one of: all users, a user, a group of users, a service, or a service of a user.

Embodiment 20. The method of any of Embodiments 17-19, wherein receiving the scheduling strategy comprises receiving an indication of one or more of: a wireless device identifier, a frequency, or a group identifier.

Embodiment 21. The method of any of Embodiments 17-20, wherein receiving the scheduling strategy comprises receiving an indication of a carrier frequency selection strategy including at least one of:

an indication that the wireless device determine a process to select a carrier frequency of a plurality of carrier frequency, an indication that the wireless device select a specific carrier frequency of the plurality carrier frequencies even if the carrier frequency does not have a highest radio quality or highest latency, an indication that the wireless device avoid selecting a carrier frequency, and an indication that the wireless device select a carrier frequency if connection retainability or quality of service is below a threshold risk value.

Embodiment 22. The method of any of Embodiments 17-21, wherein receiving the scheduling strategy comprises receiving a characteristic to prioritize, the characteristic including at least one of: latency, spectrum efficiency, low loaded carriers, or low loaded sites.

Embodiment 23. The method of any of Embodiments 17-22, further comprising:

transmitting (1240) data to the RAN node based on the scheduling strategy and the one or more available UP paths.

Embodiment 24. The method of any of Embodiments 17-23, further comprising:

transmitting (1210) user data to the CU-UP of the RAN node, wherein receiving the one or more available UP paths is responsive to transmitting the user data, and wherein receiving the scheduling strategy for data transmissions is responsive to transmitting the user data.

Embodiment 25. A wireless device (500) operating in a communication network, the wireless device adapted to perform operations, the operations comprising:

receiving (1220) one or more available user-plane, UP, paths from a Central Unit-Control plane, CU-CP, (700) of a radio access network, RAN, node (600) operating in the communication network; and receiving (1230) a scheduling strategy for data transmissions from the CU-CP (700) of the RAN node.

Embodiment 26. The wireless device of Embodiment 25, the operations further comprising any operations of Embodiments 18-24.

Embodiment 27. A wireless device (500) operating in a communication network, the wireless device comprising:

processing circuitry (503); and memory (505) coupled to the processing circuitry and having instructions stored therein that are executable by the processing circuitry to cause the wireless device 500 to perform operations, the operations comprising:

receiving (1220) one or more available user-plane, UP, paths from a Central Unit-Control plane, CU-CP, (700) of a radio access network, RAN, node (600) operating in the communication network; and receiving (1230) a scheduling strategy for data transmissions from the CU-CP (700) of the RAN node.

Embodiment 28. The wireless device of Embodiment 27, the operations further comprising any operations of Embodiments 18-24.

Embodiment 29. A computer program comprising program code to be executed by processing circuitry (503) of a wireless device (500) operating in a communication network, whereby execution of the program code causes the wireless device to perform operations, the operations comprising:

receiving (1220) one or more available user-plane, UP, paths from a Central Unit-Control plane, CU-CP, (700) of a radio access network, RAN, node (600) operating in the communication network; and receiving (1230) a scheduling strategy for data transmissions from the CU-CP (700) of the RAN node.

Embodiment 30. The computer program of Embodiment 29, the operations further comprising any operations of Embodiments 18-24.

Embodiment 31. A computer program product comprising a non-transitory storage medium (505) including program code to be executed by processing circuitry (503) of a wireless device (500) operating in a communication network, whereby execution of the program code causes the wireless device to perform operations, the operations comprising:

receiving (1220) one or more available user-plane, UP, paths from a Central Unit-Control plane, CU-CP, (700) of a radio access network, RAN, node (600) operating in the communication network; and receiving (1230) a scheduling strategy for data transmissions from the CU-CP (700) of the RAN node.

Embodiment 32. The computer program product of Embodiment 31, the operations further comprising any operations of Embodiments 18-24.

Embodiment 33. A method performed by a Central Unit-Control Plane, CU-CP, (700) of a radio access network, RAN, node (600) operating in a communication network to dynamically schedule user-plane communications, the CU-CP communicatively coupled to a Distributed Unit, DU, (900) and a Central Unit—User-Plane, CU-UP, (800) of the RAN node, the method comprising:

providing (1130) indication of one or more available user-plane, UP, paths to at least one network element, the at least one network element comprising one or more of: a user equipment, UE (500); the CU-UP of the RAN node; and/or the DU of the RAN node; and providing (1140) indication of a scheduling strategy for data transmissions to the at least one network element.

Embodiment 34. The method of Embodiment 33, wherein the at least one network element comprises the UE, wherein providing the indication of the one or more available UP paths to the at least one network element comprises transmitting radio resource control, RRC, signals to the UE indicating the one or more available UP paths, and wherein providing the indication of the scheduling strategy for data transmissions to the at least one network element comprises transmitting the RRC signals to the UE indicating the scheduling strategy.

Embodiment 35. The method of Embodiment 33, wherein the at least one network element comprises the UE, wherein providing the indication of the one or more available UP paths to the at least one network element comprises transmitting a first signal to the DU causing the DU to provide indication of the one or more available UP paths to the UE, and wherein providing the indication of the scheduling strategy for data transmissions to the at least one network element comprises transmitting a second signal to DU causing the DU to provide indication of the scheduling strategy to the UE.

Embodiment 36. The method of any of Embodiments 33-35, wherein providing the indication of the one or more UP paths comprises providing a mapping of one or more data flows to one or more radio bearers.

Embodiment 37. The method of any of Embodiments 33-36, wherein providing the indication of the scheduling strategy further comprises providing an indication to apply the scheduling strategy to at least one of: all users, a user, a group of users, a service, and a service of a user.

Embodiment 38. The method of any of Embodiments 33-37, wherein the indication of the scheduling strategy comprises an indication of one or more of: a UE identifier, a frequency, or a group identifier.

Embodiment 39. The method of any of Embodiments 33-38, wherein the scheduling strategy indicates a carrier frequency selection strategy including at least one of:

an indication that the at least one network element determine a process to select a first carrier frequency of a plurality of carrier frequencies, an indication that the at least one network element select a second carrier frequency of the plurality of carrier frequencies regardless of whether the second carrier frequency has a highest radio quality or highest latency of the plurality of carrier frequencies, an indication that the at least one network element not select a third carrier frequency of the plurality of carrier frequencies, an indication that a fourth carrier frequency of the plurality of carrier frequencies is preferred and that the at least one network element select the fourth carrier frequency based on the specific carrier frequency being preferred, an indication that the at least one network element avoid selecting a fifth carrier frequency of the plurality of carrier frequencies, and an indication that the at least one network element select a sixth carrier frequency of the plurality of carrier frequencies in response to determining that a connection retainability or quality of service is below a threshold risk value.

Embodiment 40. The method of any of Embodiments 33-39, wherein the indication of the scheduling strategy indicates a characteristic to prioritize, the characteristic including at least one of: latency, spectrum efficiency, low loaded carriers, or low loaded sites.

Embodiment 41. The method of any of Embodiments 33-40, further comprising:

receiving (1110) information from at least one of a core network, CN, node of the communication network, the UE, and a management layer; and determining (1120) the scheduling strategy based on the information.

Embodiment 42. The method of Embodiment 41, wherein the information includes at least one of: a load on the communication network and subscriptions or services associated with the user.

Embodiment 43. A Central Unit-Control Plane, CU-CP, (700) of a radio access network, RAN, node (600) operating in a communication network, the CU-CP adapted to perform operations, the CU-CP communicatively coupled to a Distributed Unit, DU, (900) and a Central Unit—User-Plane, CU-UP, (800) of the RAN node, the operations comprising:

providing (1130) indication of one or more available user-plane, UP, paths to at least one network element, the at least one network element comprising one or more of: a user equipment, UE (500); the CU-UP of the RAN node; and/or the DU of the RAN node; and providing (1140) indication of a scheduling strategy for data transmissions to the at least one network element.

Embodiment 44. The CU-CP of Embodiment 43, the operations further comprising any operations of Embodiments 34-42.

Embodiment 45. A Central Unit-Control Plane, CU-CP, (700) of a radio access network, RAN, node (600) operating in a communication network, the CU-CP communicatively coupled to a Distributed Unit, DU, (900) and a Central Unit—User-Plane, CU-UP, (800) of the RAN node, the CU-CP comprising:

processing circuitry (703); and memory (705) coupled to the processing circuitry and having instructions stored therein that are executable by the processing circuitry to cause the CU-CP to perform operations, the operations comprising:

providing (1130) indication of one or more available user-plane, UP, paths to at least one network element, the at least one network element comprising one or more of: a user equipment, UE (500); the CU-UP of the RAN node; and/or the DU of the RAN node; and providing (1140) indication of a scheduling strategy for data transmissions to the at least one network element.

Embodiment 46. The CU-CP of Embodiment 45, the operations further comprising any operations of Embodiments 34-42.

Embodiment 47. A computer program comprising program code to be executed by processing circuitry (703) of a Central Unit-Control Plane, CU-CP, (700) of a radio access network, RAN, node (600) operating in a communication network, whereby execution of the program code causes the CU-CP to perform operations, the CU-CP communicatively coupled to a Distributed Unit, DU, (900) and a Central Unit—User-Plane, CU-UP, (800) of the RAN node, the operations comprising:
providing (1130) indication of one or more available user-plane, UP, paths to at least one network element, the at least one network element comprising one or more of: a user equipment, UE (500); the CU-UP of the RAN node; and/or the DU of the RAN node; and
providing (1140) indication of a scheduling strategy for data transmissions to the at least one network element.

Embodiment 48. The computer program of Embodiment 47, the operations further comprising any operations of Embodiments 34-42.

Embodiment 49. A computer program product comprising a non-transitory storage medium (705) including program code to be executed by processing circuitry (703) of a Central Unit-Control Plane, CU-CP, (700) of a radio access network, RAN, node (600) operating in a communication network, whereby execution of the program code causes the CU-CP to perform operations, the CU-CP communicatively coupled to a Distributed Unit, DU, (900) and a Central Unit—User-Plane, CU-UP, (800) of the RAN node, the operations comprising:
providing (1130) indication of one or more available user-plane, UP, paths to at least one network element, the at least one network element comprising one or more of: a user equipment, UE (500); the CU-UP of the RAN node; and/or the DU of the RAN node; and
providing (1140) indication of a scheduling strategy for data transmissions to the at least one network element.

Embodiment 50. The computer program product of Embodiment 49, the operations further comprising any operations of Embodiments 34-42.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 13:
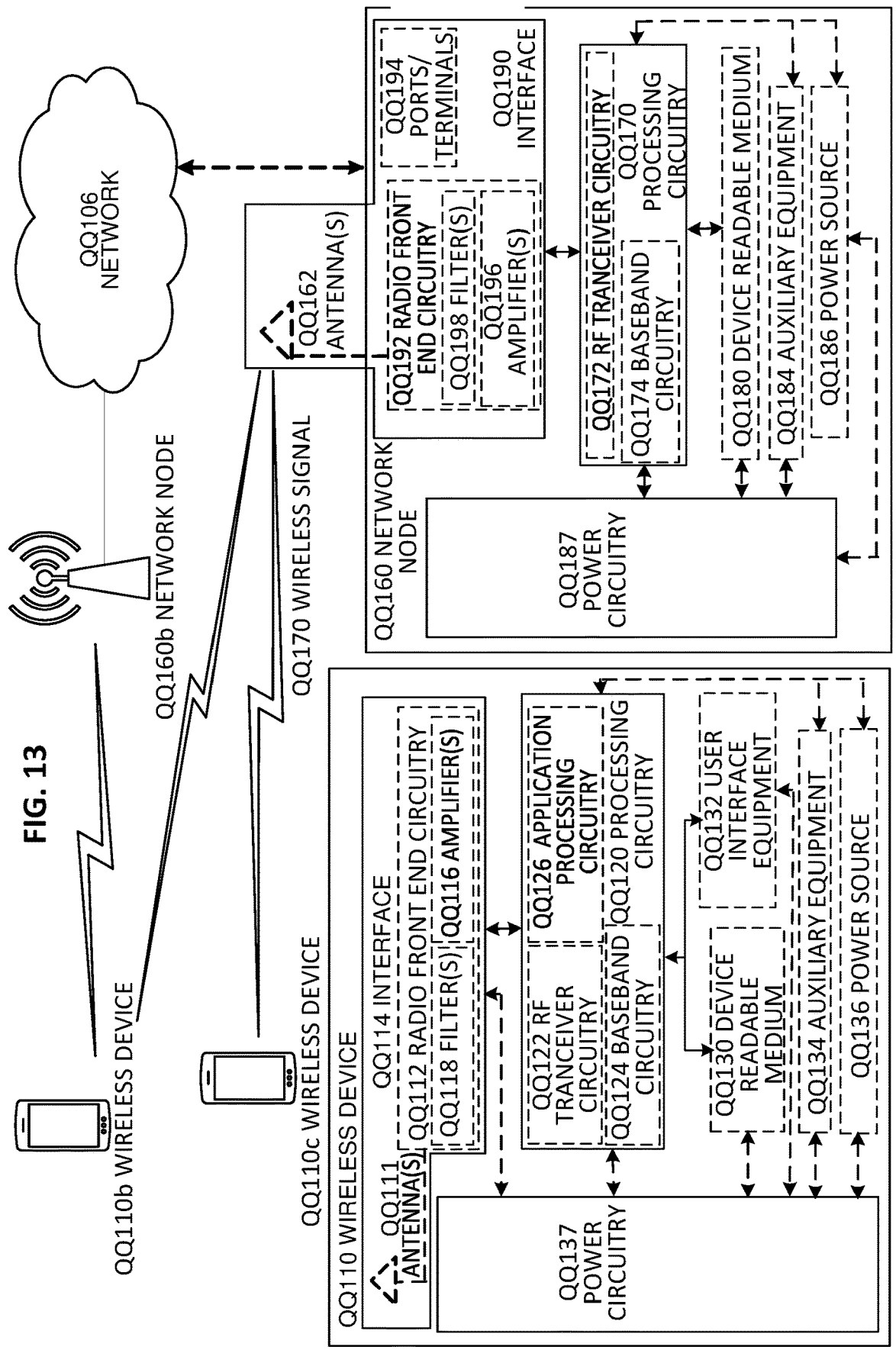
FIG. 13 is a block diagram of a wireless network in accordance with some embodiments.

FIG. 13 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 13. For simplicity, the wireless network of FIG. 13 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 13, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 131 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signaling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ192 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 13 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ112 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry QQ120. In some embodiments, processing circuitry QQ120 and device readable medium QQ130 may be considered to be integrated.

User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 14:
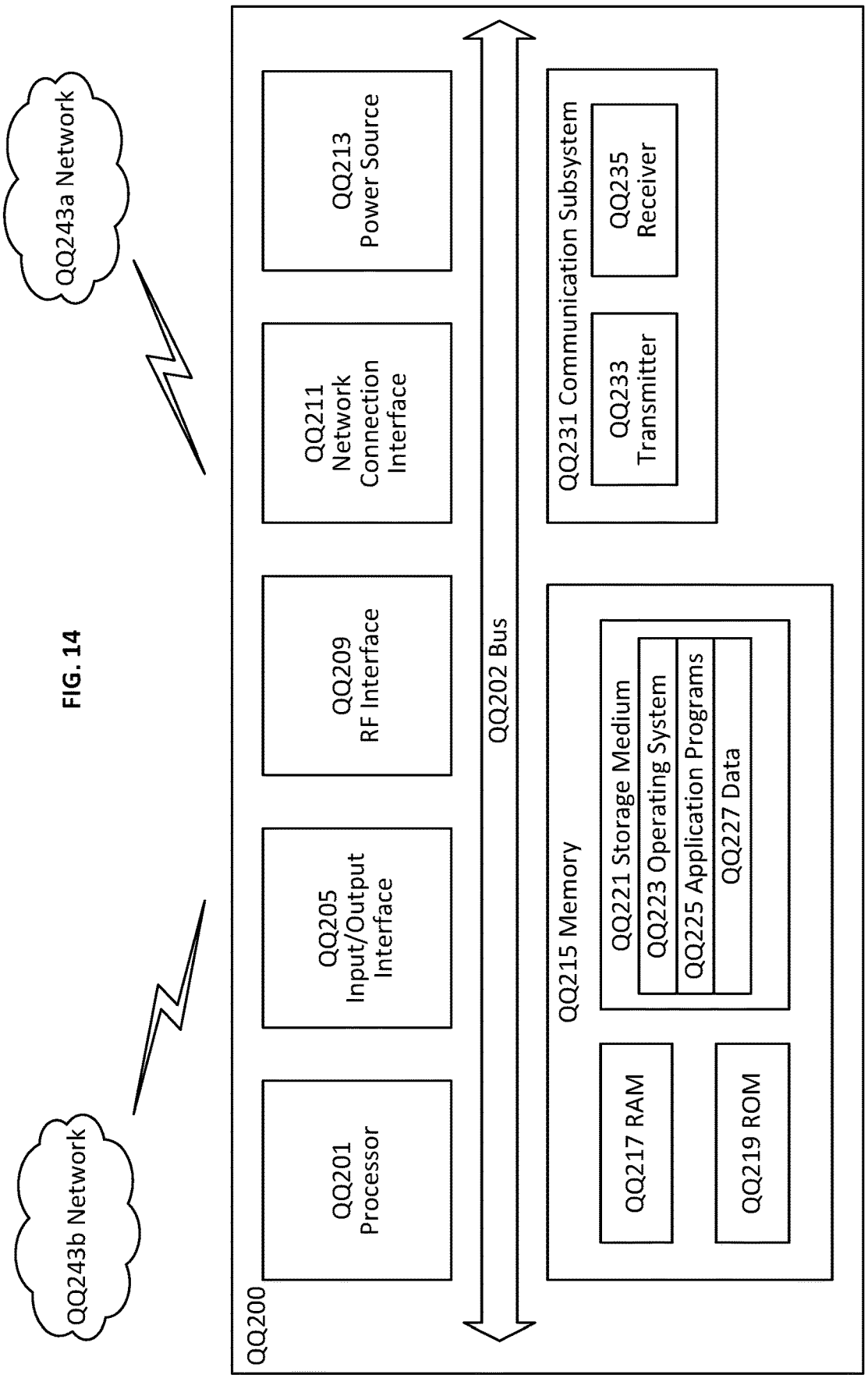
FIG. 14 is a block diagram of a user equipment in accordance with some embodiments

FIG. 14 illustrates a user Equipment in accordance with some embodiments.

FIG. 14 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 14, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 14 is a UE, the components discussed herein are equally applicable to a WD, and vice-versa.

In FIG. 14, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ213, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 14, or only a subset of the components. The level of integration between the components may vary from one UE to another UE. Further, certain UEs may contain multiple instances of a component, such as multiple processors, memories, transceivers, transmitters, receivers, etc.

In FIG. 14, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 14, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 14, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 15:
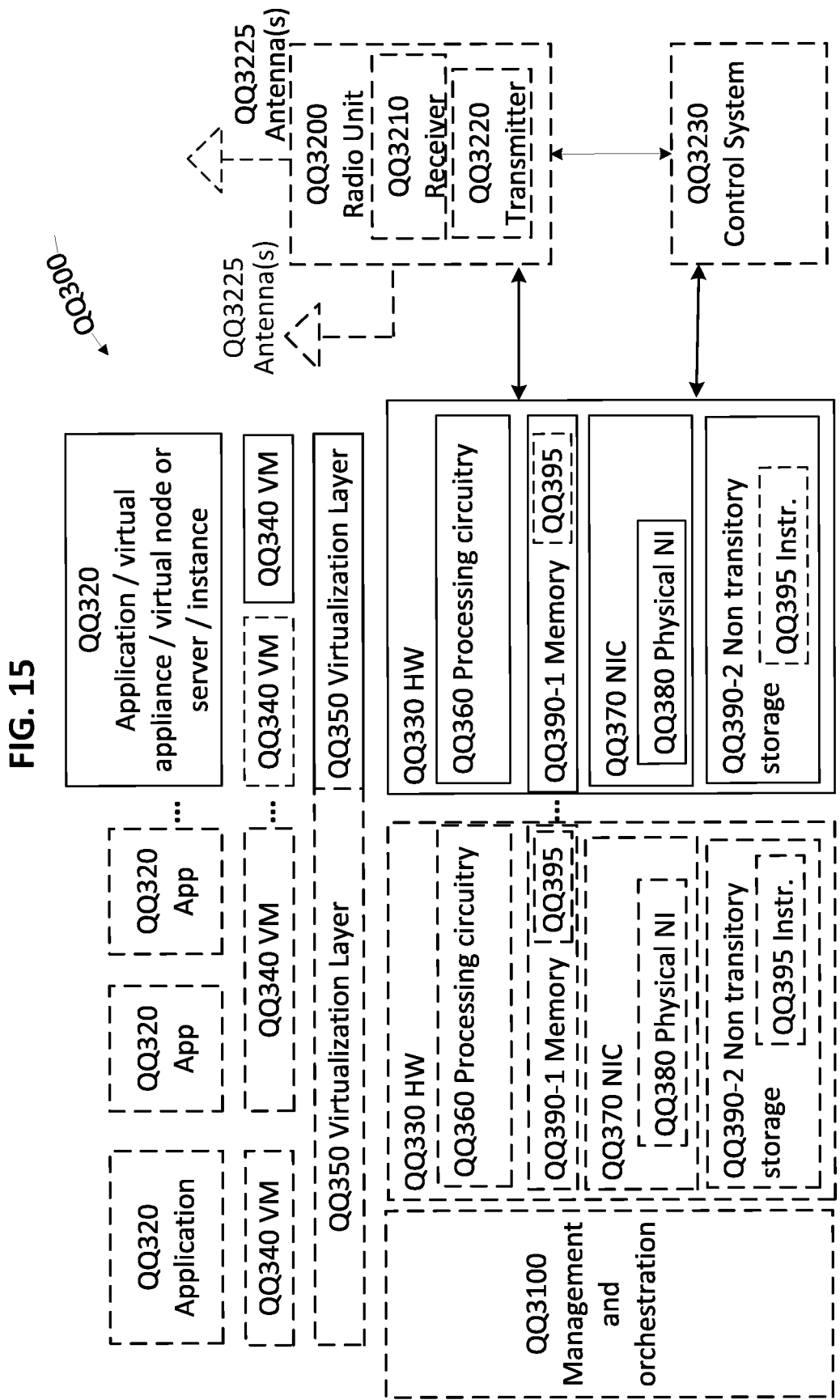
FIG. 15 is a block diagram of a virtualization environment in accordance with some embodiments.

FIG. 15 illustrates a virtualization environment in accordance with some embodiments.

FIG. 15 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 15, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 15.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signaling can be effected with the use of control system QQ3230 which may alternatively be used for communication between the hardware nodes QQ330 and radio units QQ3200.

Figure 16:
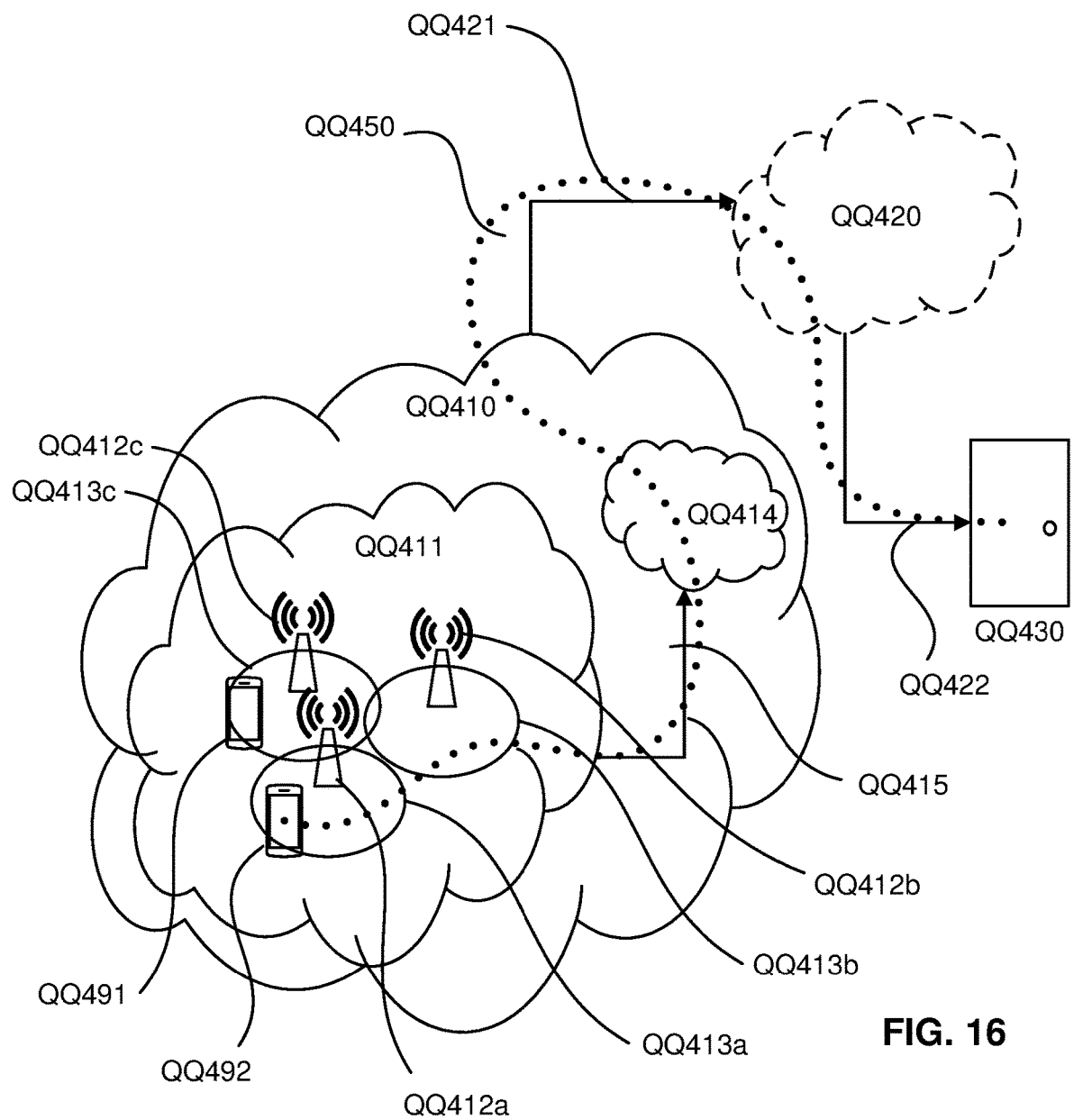
FIG. 16 is a block diagram of a telecommunication network connected via an intermediate network to a host computer in accordance with some embodiments.

FIG. 16 illustrates a telecommunication network connected via an intermediate network to a host computer in accordance with some embodiments.

With reference to FIG. 16, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 16 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 17:
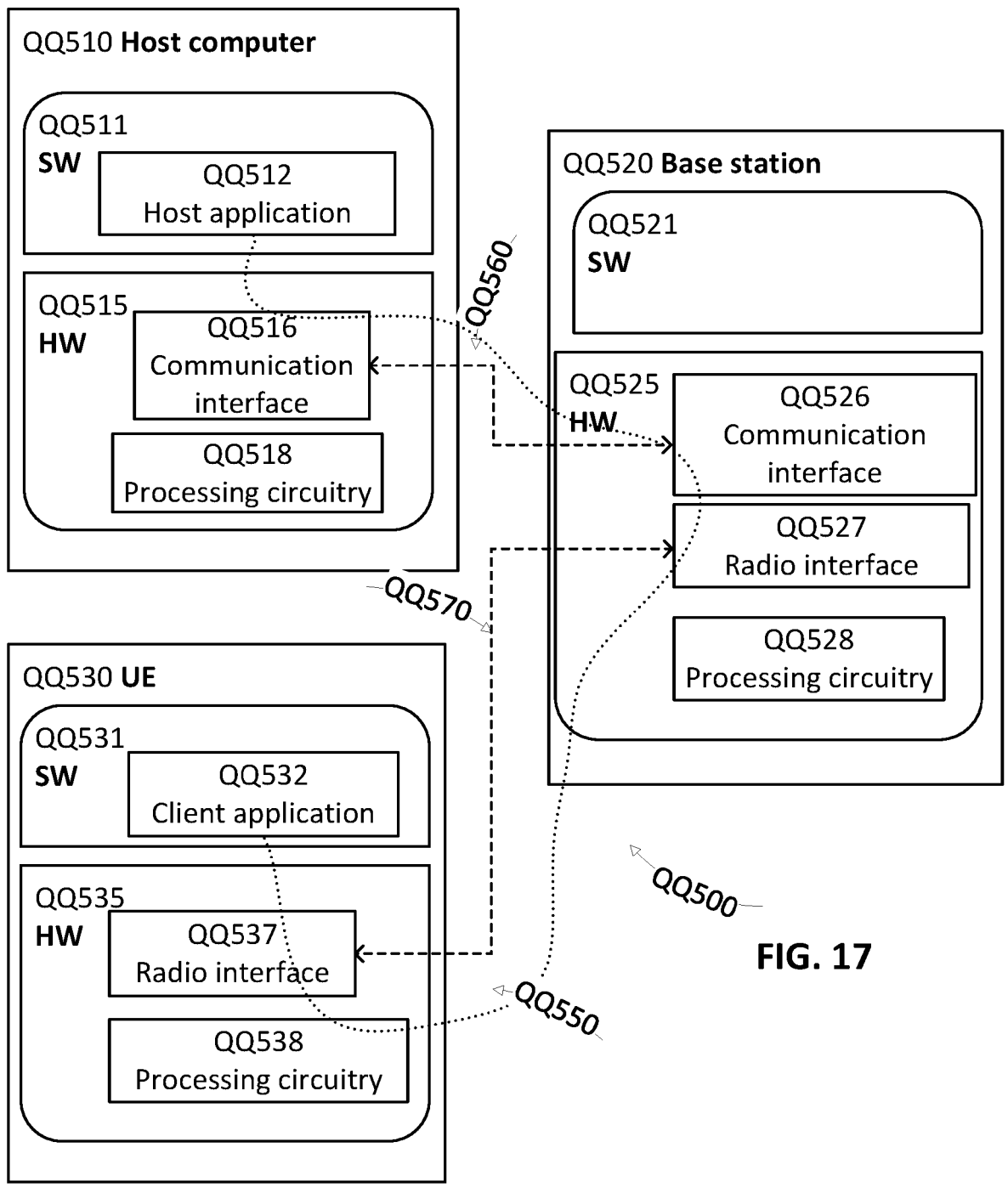
FIG. 17 is a block diagram of a host computer communicating via a base station with a user equipment over a partially wireless connection in accordance with some embodiments.

FIG. 17 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 17. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 17) served by base station QQ520. Communication interface QQ526 may be configured to facilitate connection QQ560 to host computer QQ510. Connection QQ560 may be direct or it may pass through a core network (not shown in FIG. 17) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. It's hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 17 may be similar or identical to host computer QQ430, one of base stations QQ412a, QQ412b, QQ412c and one of UEs QQ491, QQ492 of FIG. 16, respectively. This is to say, the inner workings of these entities may be as shown in FIG. 17 and independently, the surrounding network topology may be that of FIG. 16.

In FIG. 17, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the random access speed and/or reduce random access failure rates and thereby provide benefits such as faster and/or more reliable random access.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 18:
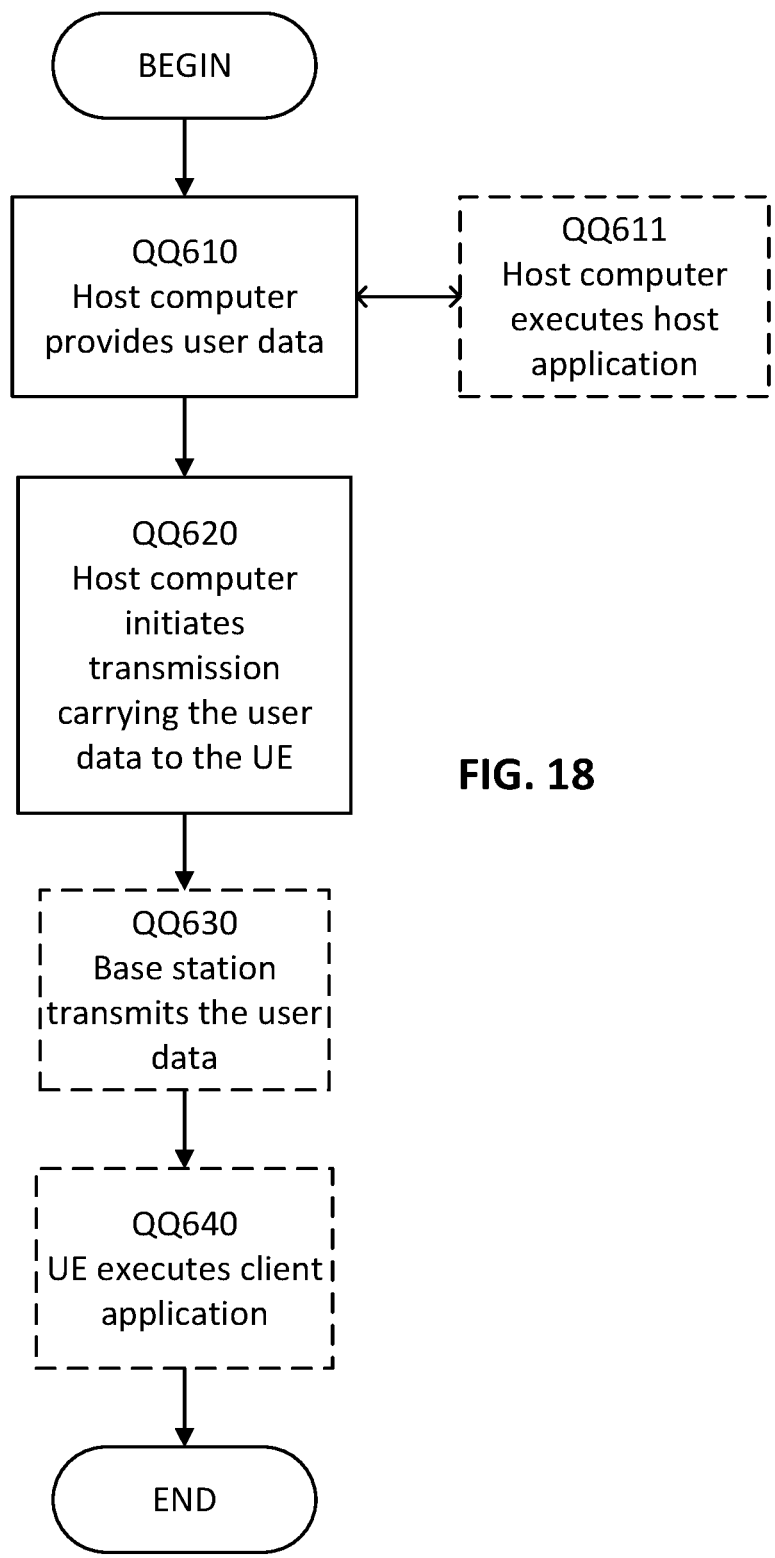
FIG. 18 is a block diagram of methods implemented in a communication system including a host computer, a base station and a user equipment in accordance with some embodiments.

FIG. 18 illustrates methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 16-17. For simplicity of the present disclosure, only drawing references to FIG. 18 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 19:
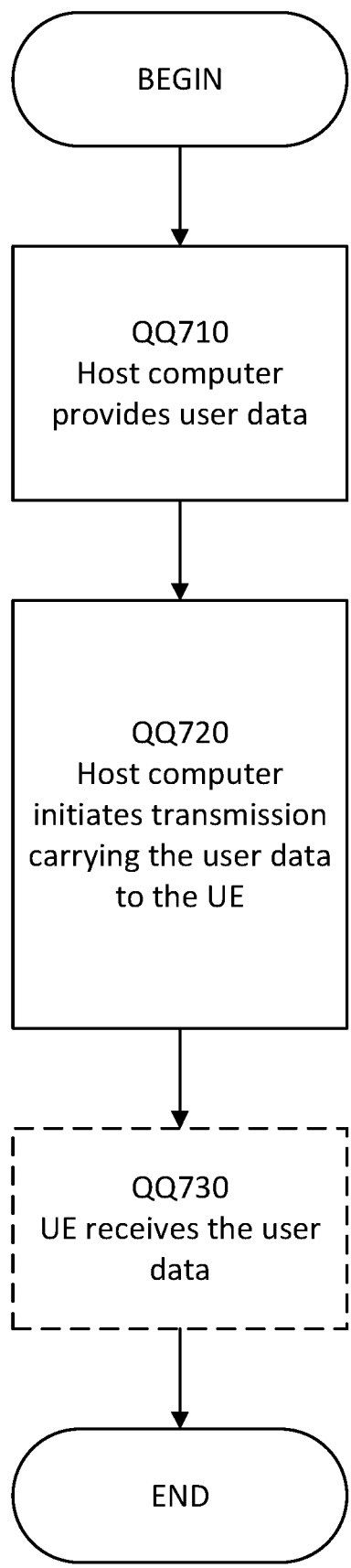
FIG. 19 is a block diagram of methods implemented in a communication system including a host computer, a base station and a user equipment in accordance with some embodiments.

FIG. 19 illustrates methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 16-17. For simplicity of the present disclosure, only drawing references to FIG. 19 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 20:
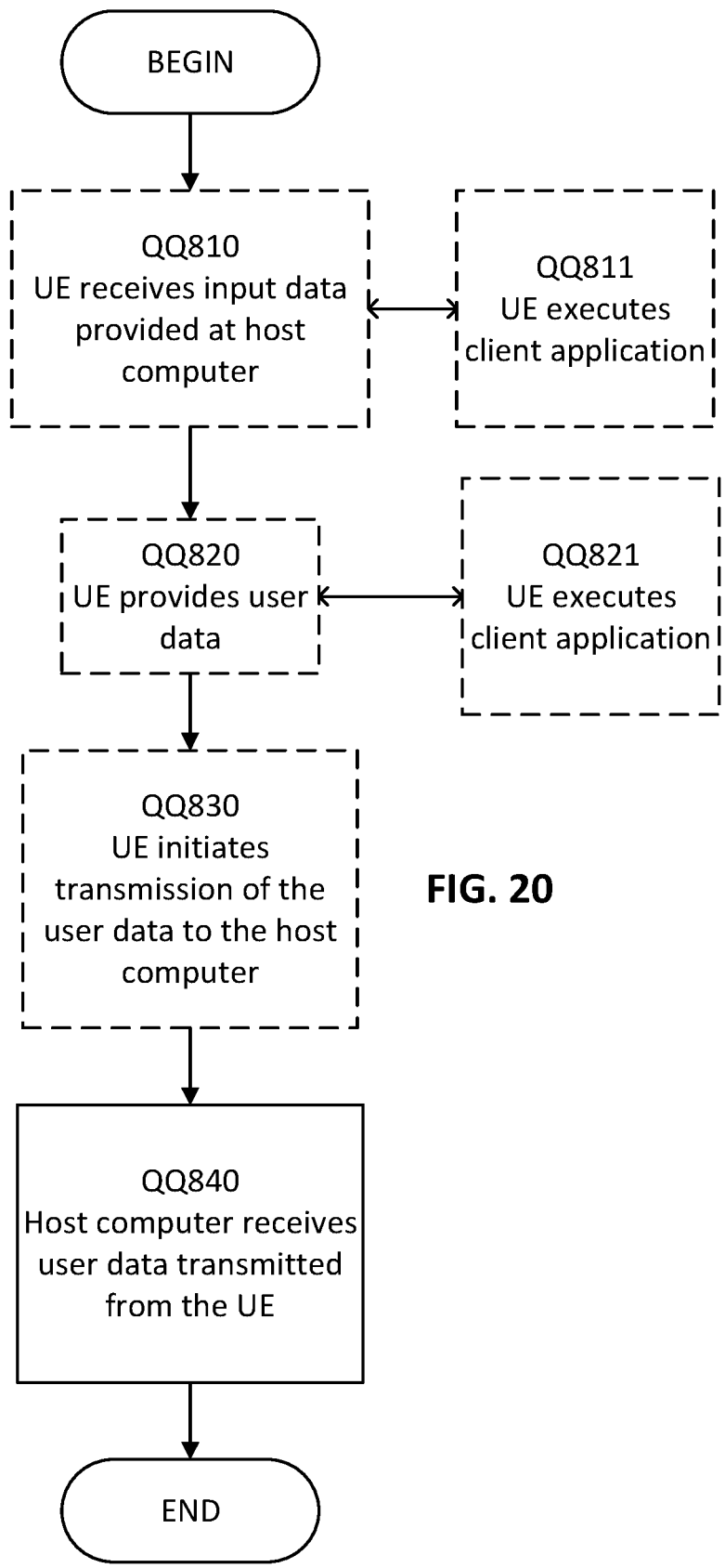
FIG. 20 is a block diagram of methods implemented in a communication system including a host computer, a base station and a user equipment in accordance with some embodiments.

FIG. 20 illustrates methods implemented in a communication system including a host computer, a base station and a user equipment in accordance with some embodiments FIG. 20 is a flowchart illustrating a method implemented in a communication system, in accordance with one embodiment. The communication system includes a host computer, a base station and a UE which may be those described with reference to FIGS. 16-17. For simplicity of the present disclosure, only drawing references to FIG. 20 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 21:
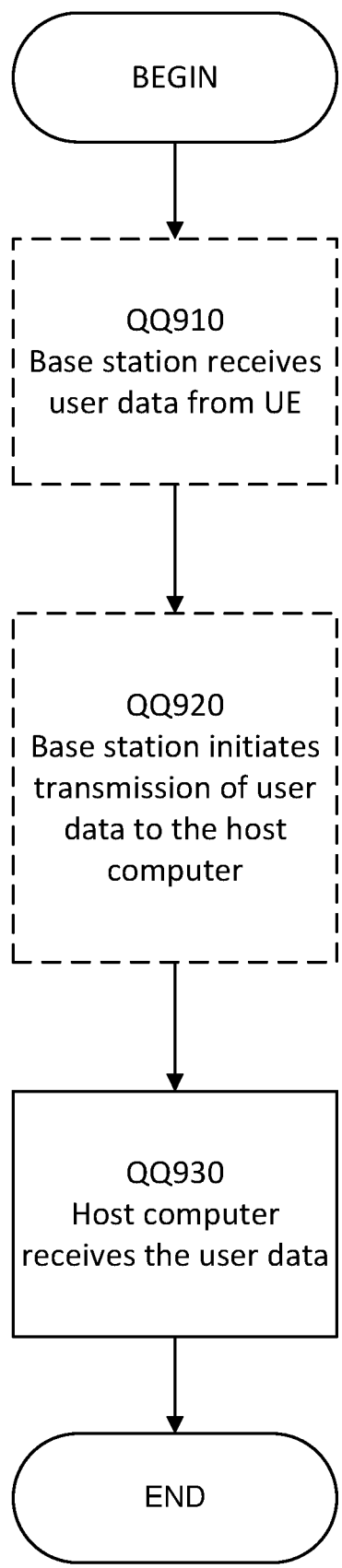
FIG. 21 is a block diagram of methods implemented in a communication system including a host computer, a base station and a user equipment in accordance with some embodiments.

FIG. 21 illustrates methods implemented in a communication system including a host computer, a base station and a user equipment in accordance with some embodiments FIG. 21 is a flowchart illustrating a method implemented in a communication system, in accordance with one embodiment. The communication system includes a host computer, a base station and a UE which may be those described with reference to FIGS. 16-17. For simplicity of the present disclosure, only drawing references to FIG. 21 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

ABBREVIATIONS

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ABS Almost Blank Subframe
ARQ Automatic Repeat Request
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
BUD Frequency Division Duplex
BPS For Further Study
GERAN GSM EDGE Radio Access Network
gNB Base station in NR
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe MDT Minimization of Drive Tests
MIB Master Information Block
MME Mobility Management Entity
MSC Mobile Switching Center
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUSCH Physical Uplink Shared Channel
RACH Random Access Channel
QAM Quadrature Amplitude Modulation
RAN Radio Access Network
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" (abbreviated "/") includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method performed by a Central Unit-Control Plane (CU-CP) of a radio access network (RAN) node operating in a communication network to dynamically schedule user-plane (UP) communications, the CU-CP communicatively coupled to a Distributed Unit (DU) and a CU-UP of the RAN node, the method comprising:
providing indication of one or more available UP paths to at least one network element, the at least one network element comprising one or more of: a user equipment, UE; the CU-UP of the RAN node; and/or the DU of the RAN node, and providing the indication of the one or more UP paths comprising providing a mapping of one or more data flows to one or more radio bearers; and
providing indication of a scheduling strategy for data transmissions to the at least one network element.

2. The method of claim 1, wherein the at least one network element comprises the UE,
wherein providing the indication of the one or more available UP paths to the at least one network element comprises transmitting radio resource control (RRC) signals to the UE indicating the one or more available UP paths, and
wherein providing the indication of the scheduling strategy for data transmissions to the at least one network element comprises transmitting the RRC signals to the UE indicating the scheduling strategy.

3. The method of claim 1, wherein the at least one network element comprises the UE,
wherein providing the indication of the one or more available UP paths to the at least one network element comprises transmitting a first signal to the DU causing the DU to provide indication of the one or more available UP paths to the UE, and
wherein providing the indication of the scheduling strategy for data transmissions to the at least one network element comprises transmitting a second signal to the DU causing the DU to provide indication of the scheduling strategy to the UE.

4. The method of claim 1, wherein providing the indication of the scheduling strategy further comprises providing an indication to apply the scheduling strategy to at least one of: all users, a user, a group of users, a service, and a service of a user.

5. The method of claim 1, wherein the indication of the scheduling strategy comprises an indication of one or more of: a UE identifier, a frequency, or a group identifier.

6. The method of claim 1, wherein the scheduling strategy indicates a carrier frequency selection strategy including at least one of:
an indication that the at least one network element determine a process to select a first carrier frequency of a plurality of carrier frequencies,
an indication that the at least one network element select a second carrier frequency of the plurality of carrier frequencies regardless of whether the second carrier frequency has a highest radio quality or highest latency of the plurality of carrier frequencies,
an indication that the at least one network element not select a third carrier frequency of the plurality of carrier frequencies,
an indication that a fourth carrier frequency of the plurality of carrier frequencies is preferred and that the at least one network element select the fourth carrier frequency based on the fourth carrier frequency being preferred,
an indication that the at least one network element avoid selecting a fifth carrier frequency of the plurality of carrier frequencies, and
an indication that the at least one network element select a sixth carrier frequency of the plurality of carrier frequencies in response to determining that a connection retainability or quality of service is below a threshold risk value.

7. The method of claim 1, wherein the indication of the scheduling strategy indicates a characteristic to prioritize, the characteristic including at least one of: latency, spectrum efficiency, low loaded carriers, or low loaded sites.

8. The method of claim 1, further comprising:
receiving information from at least one of a core network (CN) node of the communication network, the UE, and a management layer; and
determining the scheduling strategy based on the information.

9. The method of claim 8, wherein the information includes at least one of: a load on the communication network and subscriptions or services associated with the user.

10. A Central Unit-Control Plane (CU-CP) of a radio access network (RAN) node operating in a communication network, the CU-CP communicatively coupled to a Distributed Unit (DU) and a Central Unit—User-Plane (CU-UP) of the RAN node, the CU-CP comprising:
processing circuitry; and
memory coupled to the processing circuitry and having instructions stored therein that are executable by the processing circuitry to cause the CU-CP to perform operations, the operations comprising:
providing indication of one or more available UP paths to at least one network element, the at least one network element comprising one or more of: a user equipment (UE); the CU-UP of the RAN node; and/or the DU of the RAN node, and providing the indication of the one or more UP paths comprising providing a mapping of one or more data flows to one or more radio bearers; and
providing indication of a scheduling strategy for data transmissions to the at least one network element.

11. The CU-CP of claim 10,
wherein the at least one network element comprises the UE,
wherein providing the indication of the one or more available UP paths to the at least one network element comprises transmitting radio resource control (RRC) signals to the UE indicating the one or more available UP paths, and
wherein providing the indication of the scheduling strategy for data transmissions to the at least one network element comprises transmitting the RRC signals to the UE indicating the scheduling strategy.

12. The CU-CP of claim 10, wherein the at least one network element comprises the UE,
wherein providing the indication of the one or more available UP paths to the at least one network element comprises transmitting a first signal to the DU causing the DU to provide indication of the one or more available UP paths to the UE, and
wherein providing the indication of the scheduling strategy for data transmissions to the at least one network element comprises transmitting a second signal to the DU causing the DU to provide indication of the scheduling strategy to the UE.

13. The CU-CP of claim 10, wherein providing the indication of the scheduling strategy further comprises providing an indication to apply the scheduling strategy to at least one of: all users, a user, a group of users, a service, and a service of a user.

14. A computer program product comprising a non-transitory storage medium including program code to be executed by processing circuitry of a Central Unit-Control Plane (CU-CP) of a radio access network (RAN) node operating in a communication network, whereby execution of the program code causes the CU-CP to perform operations, the CU-CP communicatively coupled to a Distributed Unit (DU) and a Central Unit-User Plane (CU-UP) of the RAN node, the operations comprising:
providing indication of one or more available UP paths to at least one network element, the at least one network element comprising one or more of: a user equipment, UE; the CU-UP of the RAN node; and/or the DU of the RAN node, and providing the indication of the one or more UP paths comprising providing a mapping of one or more data flows to one or more radio bearers; and
providing indication of a scheduling strategy for data transmissions to the at least one network element.

15. The computer program product of claim 14,
wherein the at least one network element comprises the UE,
wherein providing the indication of the one or more available UP paths to the at least one network element comprises transmitting radio resource control (RRC) signals to the UE indicating the one or more available UP paths, and
wherein providing the indication of the scheduling strategy for data transmissions to the at least one network element comprises transmitting the RRC signals to the UE indicating the scheduling strategy.

16. The computer program product of claim 14, wherein the at least one network element comprises the UE,
wherein providing the indication of the one or more available UP paths to the at least one network element comprises transmitting a first signal to the DU causing the DU to provide indication of the one or more available UP paths to the UE, and
wherein providing the indication of the scheduling strategy for data transmissions to the at least one network element comprises transmitting a second signal to the DU causing the DU to provide indication of the scheduling strategy to the UE.

17. The computer program product of claim 14, wherein providing the indication of the one or more UP paths comprises providing a mapping of one or more data flows to one or more radio bearers.

18. The computer program product of claim 14, wherein providing the indication of the scheduling strategy further comprises providing an indication to apply the scheduling strategy to at least one of: all users, a user, a group of users, a service, and a service of a user.

* * * * *